United States Patent
Lee et al.

(10) Patent No.: US 10,284,476 B1
(45) Date of Patent: May 7, 2019

(54) SIGNATURE PATTERN DETECTION IN NETWORK TRAFFIC

(71) Applicants: Hojae Lee, Chesterfield, MO (US); Paul Seungkyu Min, Clayton, MO (US)

(72) Inventors: Hojae Lee, Chesterfield, MO (US); Paul Seungkyu Min, Clayton, MO (US)

( * ) Notice: Subject to any disclaimer, the term of this patent is extended or adjusted under 35 U.S.C. 154(b) by 0 days.

(21) Appl. No.: 16/050,863

(22) Filed: Jul. 31, 2018

(51) Int. Cl.
*H04L 12/851* (2013.01)
*H04L 9/06* (2006.01)
*G06K 9/62* (2006.01)

(52) U.S. Cl.
CPC ........ *H04L 47/2441* (2013.01); *G06K 9/6267* (2013.01); *H04L 9/0643* (2013.01)

(58) Field of Classification Search
CPC .. H04L 47/2441; H04L 9/0643; G06K 9/6267
See application file for complete search history.

(56) References Cited

U.S. PATENT DOCUMENTS

| | | | |
|---|---|---|---|
| 2008/0028468 A1* | 1/2008 | Yi | H04L 63/1416 726/23 |
| 2009/0100055 A1* | 4/2009 | Wang | G06F 21/564 |
| 2017/0329821 A1* | 11/2017 | Agrawal | G06F 17/30339 |

OTHER PUBLICATIONS

Honeycomb: Creating Intrusion Detection Signatures Using Honeypots. C. Kreibich and J. Crowcroft. 2nd Workshop on Hot Topics in Networks (HotNets-II), 2003, Boston, USA. Retrieved on Nov. 16, 2018. Retrieved from Internet <URL: http://www.icir.org/christian/publications/honeycornb-hotnetsII.pdf>. (Year: 2003).*

* cited by examiner

*Primary Examiner* — Omar J Ghowrwal
(74) *Attorney, Agent, or Firm* — Armstrong Teasdale LLP

(57) ABSTRACT

A network device includes a substring indicator memory and a signature search module for detecting a signature pattern within a stream of network traffic. The signature search module is configured to receive the stream of network traffic, identify a first subject substring from the stream of network traffic, generate a first substring indicator for the first subject substring using a first bitmask on the first subject substring, the first bitmask identifying a plurality of masked bits of the first subject substring, identify a first counter using the first substring indicator as an address into the substring indicator memory, and generate an indication that the signature pattern may be present in the stream of network traffic based on a value of the first counter.

20 Claims, 23 Drawing Sheets

SIGNATURE PATTERN DETECTION IN NETWORK TRAFFIC

FIELD OF THE DISCLOSURE

This disclosure relates generally to pattern matching and, more particularly, to devices, systems, and methods for detecting patterns using hierarchical searching.

BACKGROUND

In the field of computer science, pattern matching involves checking a given sequence of tokens, such as a sequence of bytes, for a particular pattern. These digital patterns are sometimes referred to as "signatures" or "signature patterns." Many signature search methods have been developed and deployed, and for a variety of uses. For example, pattern matching has been used in cyber-security (e.g., to detect malicious computer software), surveillance systems, and other automated systems used in domestic and industrial settings. Some known systems have implemented a hardware-based approach to pattern matching, while other systems have implemented a software-based approach. Due at least in part to certain inherent characteristics of hardware- and software-based solutions, those known systems have experienced differing issues with each approach. For example, while traditional software-based pattern matching methods may provide some flexibility in certain aspects (e.g., easier to reconfigure and adapt to variation in signature patterns), software-based implementations are often slower than hardware-based methods (e.g., due to granularity of instruction cycles, ancillary operating overhead, and the like). Traditional hardware-based implementations typically provide greater speed, but they are often more rigidly structured than software-based approaches, and thus are generally more difficult to reconfigure (e.g., as requirements change with time-sensitive applications).

Accordingly, as the amount of data processing and transmission speed grows, there is a need for signature search devices and methods that can operate at faster rates, providing the benefits of a hardware-based approach, but with the reconfigurability of a software-based approach.

BRIEF DESCRIPTION

In one aspect, a network device is provided. The network device includes a substring indicator memory. The network device also includes a signature search module for detecting a signature pattern within a stream of network traffic. The signature search module is configured to receive the stream of network traffic. The signature search module is also configured to identify a first subject substring from the stream of network traffic. The signature search modules is further configured to generate a first substring indicator for the first subject substring using a first bitmask on the first subject substring. The first bitmask identifies a plurality of masked bits of the first subject substring. The signature search module is also configured to identify a first counter using the first substring indicator as an address into the substring indicator memory. The signature search module is further configured to generate an indication that the signature pattern may be present in the stream of network traffic based on a value of the first counter.

In another aspect, a method for performing hardware-based pattern matching in a network device is provided. The method includes receiving, by a signature search module of the network device, a stream of network traffic. The method also includes identifying a first subject substring from the stream of network traffic. The method further includes generating a first substring indicator for the first subject substring using a first bitmask on the first subject substring. The first bitmask identifies a plurality of masked bits of the first subject substring. The method also includes identifying a first counter using the first substring indicator as an address into a substring indicator memory. The method further includes generating an indication that the signature pattern may be present in the stream of network traffic based on a value of the first counter.

In yet another aspect, a network interface card for performing hardware-based pattern matching is provided. The network interface card is configured to be installed as a line card in a line card slot of a network device and interface with a backplane of the network device. The network interface card includes a backplane connector configured to allow the network interface card to electronically couple with the backplane of the network device. The network interface card also includes one or more ports configured to receive a stream of network traffic. The network interface card further includes a substring indicator memory. The network interface card also includes a signature search module for detecting a signature pattern within the stream of network traffic. The signature search module is configured to identify a first subject substring from the stream of network traffic. The signature search module is also configured to generate a first substring indicator for the first subject substring using a first bitmask on the first subject substring. The first bitmask identifies a plurality of masked bits of the first subject substring. The signature search module is further configured to identify a first counter using the first substring indicator as an address into the substring indicator memory. The signature search module is also configured to generate an indication that the signature pattern may be present in the stream of network traffic based on a value of the first counter.

BRIEF DESCRIPTION OF THE DRAWINGS

FIGS. 1-19 show example embodiments of the devices, systems, and methods described herein.

FIG. 1 is a diagram illustrating an example network environment in which a signature detection engine analyzes network traffic for signature patterns.

FIG. 2 is a diagram illustrating components of signature detection engine shown in FIG. 1.

FIG. 3 is a diagram illustrating various example components of signature update module and example data flow between those components.

FIG. 4 illustrates data flow and operation of signature table module in greater detail.

FIG. 5 illustrates example results of data partitioning operations performed by signature partition module on signatures.

FIG. 6 illustrates example results of substring masking operations performed by substring masking module based on substrings.

FIG. 10 illustrates a memory allocation process performed by substring storage address allocation module.

FIG. 11 illustrates an update and activation process for search block module(s) allocated after positive response is received by update control module.

FIG. 12 is a component diagram illustrating additional components of search block module.

FIG. 13 is a diagram illustrating various example components of signature search module and example data flow between those components.

FIG. 14 illustrates data flow and operation of data input queue module in greater detail.

FIG. 15 illustrates original data as a chronological stream of data, as received by data partition module.

FIG. 16 illustrates an example embodiment in which subject substring indicator generation module generates a set of substring indicators for the 4-byte subject substring generated by data partition module and included in subject substrings.

FIG. 17 illustrates example searching operations performed by search block match module in conjunction with search blocks.

FIG. 18 illustrates components of substring match module used to identify an associated substring memory region within substring memory module.

FIG. 19 illustrates components of signature match decision module and associated operations.

Like numbers in the figures indicate the same or functionally similar components.

DETAILED DESCRIPTION

Figure 1:
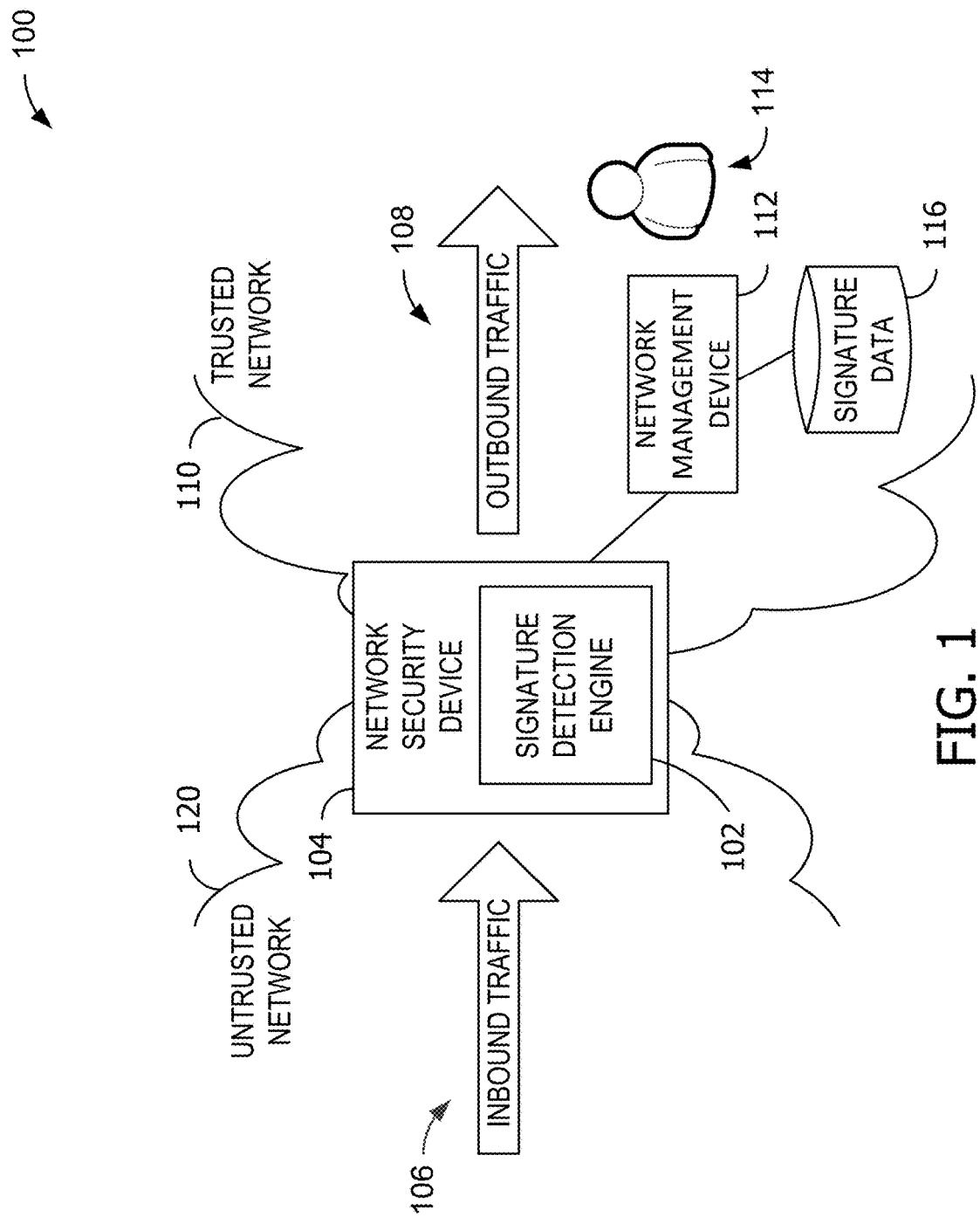

The present disclosure relates to pattern matching devices, systems, and associated methods are described herein. In various example embodiments, a signature detection engine provides a hardware-based approach to pattern matching, but with the configurability and flexibility more typical of a software-based approach. The signature detection engine implements a hierarchical approach to pattern matching, decomposing arbitrary length signature patterns into multiple smaller substrings and utilizing hardware-based search modules (e.g., logic circuits) to examine source data (e.g., a sequence of data bytes from a computer file or a network data packet) for the desired substrings. When the substrings of a particular signature pattern are detected in the source data, the signature detection engine correlates the detections of the various substrings of the signature pattern to identify the presence of the entire signature pattern within the source string.

In one example embodiment, the signature detection engine is utilized within a networking device for purposes of computer security ("cybersecurity"). Malicious actors, often referred to as "hackers," have exposed myriad vulnerabilities of computers and computer infrastructure, including, for example, denial-of-service attacks that can render a target system or service unusable, direct-access attacks that can allow the hacker to directly access computers and their protected data and services, viruses and worms that can disrupt system operation or hijack the computer systems, amongst many others. Many of these vulnerabilities are facilitated across computer networks. For example, a particular virus may propagate from one computer to another computer via an attachment to an email that is downloaded across a network to the recipient's computer, or a particular intrusion attack may be attempted on a target computer across the network. Computer security administrators may develop signature patterns for each of these various types of attacks or malware (collectively, "threats").

The signature detection engine analyzes inbound network traffic (e.g., packet inspection) using these various signature patterns in order to mitigate threats. In some embodiments, the signature detection engine is implemented on a network device, such as a firewall or a switch, and may be deployed and configured to analyze traffic passing through the device (e.g., from the Internet into an enterprise network). A security administrator may configure the signature detection engine with many (e.g., perhaps hundreds or thousands of) signature patterns that have been designed to detect various threats. Each particular signature pattern may be broken up into various smaller (e.g., 4, 8, or 16 byte) pattern substrings (or just "substrings"), and each substring is assigned to an individual search module. In other words, a given search module has an assigned substring, and that search module is configured to identify when that substring is found in a source string. Thus, a group of search modules is configured to search the source string for each of the various substrings.

In one example embodiment, during configuration, the signature detection engine divides signatures into multiple smaller substrings, such as 4-byte, 8-byte, or 16-byte substrings. For each of those substrings, the signature detection engine generates a masked substring that represents a portion of that substring. Each masked substring is then assigned to a particular search module, which, during operation, will search incoming network traffic for that particular masked substring. Further, the signature detection engine also uses bits from the masked substring to generate an address that is used to determine which search module is assigned to this masked substring. This address generation process acts as a pseudo-hash into an address space of the group of search modules, assembling an address from existing bits of the masked substring. Assembling an address from existing bits, inter alia, provides a faster way to generate an address over conventional computation of a hash value.

During operation, the signature detection engine analyzes an inbound traffic stream (e.g., network packets) for the signature patterns. In an example embodiment, an inbound traffic stream (e.g., the data portion of a TCP/IP packet) is directed through (e.g., as an electrical signal of a data stream) a substring indicator module. A set of substring indicators is generated for an inbound substring, where each of the substring indicators is made up of particular bits of the inbound string. The substring indicators are then used as addresses within the substring indicator module. Each substring indicator references to a counter within the memory of the substring indicator module that identifies whether or not that particular substring indicator is active (e.g., whether the substring indicator is a part of one or more substrings that are actively being searched). The substring indicator module indicates when a particular substring indicator is detected (e.g., within the data field of the TCP/IP packet). If all of the substring indicators for a particular substring are triggered by the inbound string, then the signature detection engine examines the inbound substring against the configured substring to see if the inbound substring is actually a match. Upon detecting each substring of a signature, the signature detection engine may, for example, generate an indication that the particular search pattern has been identified within the network flow, or the signature detection engine may be configured to take some action relative to the detection, such as dropping a packet, blocking subsequent packets to or from associated addresses, terminating a session, and so forth.

In some embodiments, the signature detection engine analyzes segments of inbound traffic at each clock cycle, generating several windowed segments of the same sizes as the masked substrings used above. In other words, the signature detection engine generates three input strings in a sliding window, using the last 4 bytes, 8 bytes, and 16 bytes of network data. For each windowed segment of inbound traffic, the signature detection engine generates a set of addresses (a set of substring indicators) using the same address generation process used during configuration, but based on the three windowed segments of data. As such, each windowed segment of data addresses a set of counters in the memory of the substring indicator module. The signature detection engine then evaluates whether each particular substring indicator is active (e.g., non-zero). Since the same addressing scheme was used for the configuration process as for the network traffic processing, the set of addresses generated for the particular windowed segment will be used to inspect the same substring indicators for which that pattern was configured). As such, generating the addresses during operation can be done at clock speed, allowing the signature detection engine to quickly direct the segments of inbound network traffic to particular search modules for comparison without burdensome hashing computations.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a diagram illustrating an example network environment 100 in which a signature detection engine 102 analyzes network traffic for signature patterns. As depicted in FIG. 1, signature detection engine 102 is integrated within a network security device 104. In the example embodiment, network security device 104 is a perimeter network device, such as a firewall, separating an untrusted network 120 (e.g., the Internet) from a protected network 110 (e.g., an enterprise network). In other embodiments, network security device 104 may be an infrastructure network device such as a switch or a router. Further, in some embodiments, signature detection engine 102 is an onboard hardware component of network security device 104 (e.g., where network security device 104 is configured as a dedicated network security appliance), where in other embodiments, signature detection engine 102 is configured as a modular card deployed within a multi-functional network device such as an enterprise switch, router, or next-generation firewall (e.g., combining multiple security functions, such as deep packet inspection, intrusion prevention, encrypted traffic inspection, identity management, and the like).

Network environment 100, in the example embodiment, also includes a network management device 112 deployed within trusted network 110 and operated by a network administrator 114. Network administrator 114 may use network management device 112 to configure signature detection engine 102. In some situations, network administrator 114 may push signature updates to signature detection engine 102 via network management device 112. In some embodiments, signature detection engine 102 may transmit alert messages, log information, or other pattern search results data to network management device 112 (e.g., for purposes of tracking or alerting on pattern matches, packet drops, and so forth). For example, network management device 112 may include a security administration utility (not separately shown) that transmits updated search patterns from signature data 116 database to signature detection engine 102 (e.g., during initial configuration, during searching operations).

During configuration operations, signature detection engine 102 receives multiple signature patterns for deployment. In the example embodiment, each signature pattern represents a set of bytes that, if found within inbound traffic 106, may indicate an attempt to breach some aspect of computer security. In some situations, a signature pattern may be a fixed string of data bytes (e.g., a normal string of data). For example, one signature may be a 20-byte string that accompanies a certain type of hack attempt. Signature detection engine 102 partitions each individual signature pattern into one or more substrings (e.g., 4-byte string(s), 8-byte string(s), 16-byte string(s), or some combination). For example, the 20-byte signature may be broken into four 4-byte strings, or two 8-byte strings and a 4-byte string, or one 16-byte string and one 4-byte string. Signature detection engine 102 includes many search modules, each of which may be configured to search for a single substring. After partitioning, each substring is assigned to a particular search module within signature detection engine 102, thereby configuring each individual search module to detect an associated substring.

During operation, signature detection engine 102 is configured to analyze inbound traffic 106 for various signature patterns, as configured by network administrator 114. More specifically, in the example embodiment, network security device 104 receives a flow of inbound network traffic (or just "inbound traffic") 106 (e.g., in the form of TCP/IP packets) from untrusted network 120 and transmits a flow of outbound network traffic (or just "outbound traffic") 108 into trusted network 110. Signature detection engine 102 analyzes that inbound traffic 106 for the configured search patterns. In some embodiments, signature detection engine 102 is configured to drop packets that match one or more of the signatures, or to log or transmit an alert upon identifying a pattern match within inbound traffic 106.

In some embodiments, network security device 104 may perform the packet inspection methods described herein on any network traffic passing through network security device 104. For example, network security device 104 may be an enterprise router or switch deployed within trusted network 110, or may be a core switch deployed out in untrusted network 120 (e.g., an Internet backbone switch). As such, inbound traffic 106 may be from any traffic source supported by network security device 104, and outbound traffic 108 may be to any supported network or endpoint device. In other embodiments, signature detection engine 102 may be utilized to analyze non-network data, such as a stream of binary data (e.g., static data from an electronic file), or for applications involving hierarchical historical data records (e.g., block chain, cryptocurrency).

Figure 2:
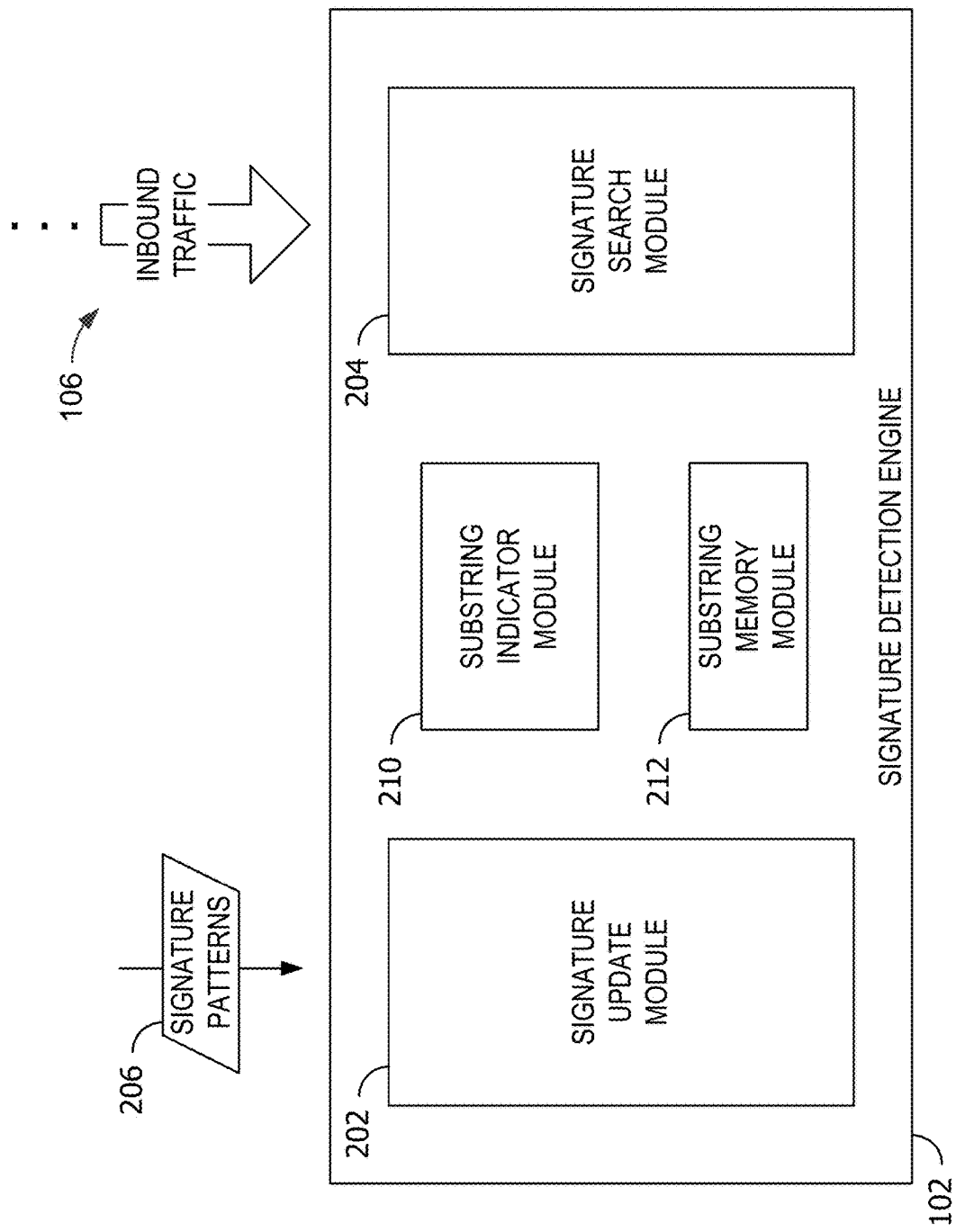

FIG. 2 is a diagram illustrating components of signature detection engine 102 shown in FIG. 1. In the example embodiment, signature detection engine 102 is deployed in network security device 104 and analyzes a data stream such as inbound traffic 106 for occurrences of various signature patterns 206. Signature detecting engine 102 includes a signature update module 202, a signature search module 204, a search blocks module 210, and a substring memory module 212. Signature update module 202 is configured to receive signature patterns 206 (e.g., from network management device 112) and prepare those signature patterns 206 for use during packet inspection. Sub string memory module 212 is configured to store data associated with signature patterns 206 for use in processing additional comparison functionality when the search blocks module 210 identifies a potential occurrence of a particular substring within the inbound traffic 106. Signature search module 204 is configured to receive a data stream (e.g., inbound traffic 106) and coordinate the searching performed by search blocks module 210. Search blocks module 210 includes many search modules (not separately shown in FIG. 2) that are configured to perform searching on inbound traffic 106 to detect signature patterns.

During configuration operations, signature update module 202 receives signature patterns 206 to be added to signature detection engine 102. Signature update module 202 performs preparation operations on signature patterns 206. More specifically, and for example, signature update module 202 breaks up a longer signature pattern 206 into several smaller patterns, or "substrings." In some examples, signature patterns 206 may be of arbitrarily length and signature update module 202 segments the longer signature pattern 206 into multiple substrings of 4 bytes, 8 bytes, or 16 bytes. The substrings or associated data are then stored in substring memory module 212 for use during searching operations. Further, each substring is assigned to a particular search module within search blocks module 210, such that each particular search module is configured to detect the presence of the associated substring within inbound traffic 106.

During searching operations, signature search module 204 receives inbound traffic 106 and performs preparation operations on inbound traffic 106. Signature search module 204 directs inbound traffic 106 through search blocks module 210. The search blocks within search blocks module 210 analyze inbound traffic 106 and generate individual alerts when their associated substrings are identified. From these individual alerts, signature search module 204 correlates when each substring of a particular signature pattern 206 is detected, and thus identifies when the signature pattern 206 is present.

FIGS. 3-12 describe aspects of configuration operations performed by signature detection engine 102. FIGS. 13-19 describe aspects of searching operations performed by signature detection engine 102. More specifically, signature update module 202 is described in greater detail below with respect to FIGS. 3-8. Search blocks module 210 is described in greater detail below with respect to FIGS. 9-11. Substring memory module 212 is described in greater detail below with respect to FIG. 12. Signature search module 204 is described in greater detail below with respect to FIGS. 13-19.

Figure 3:
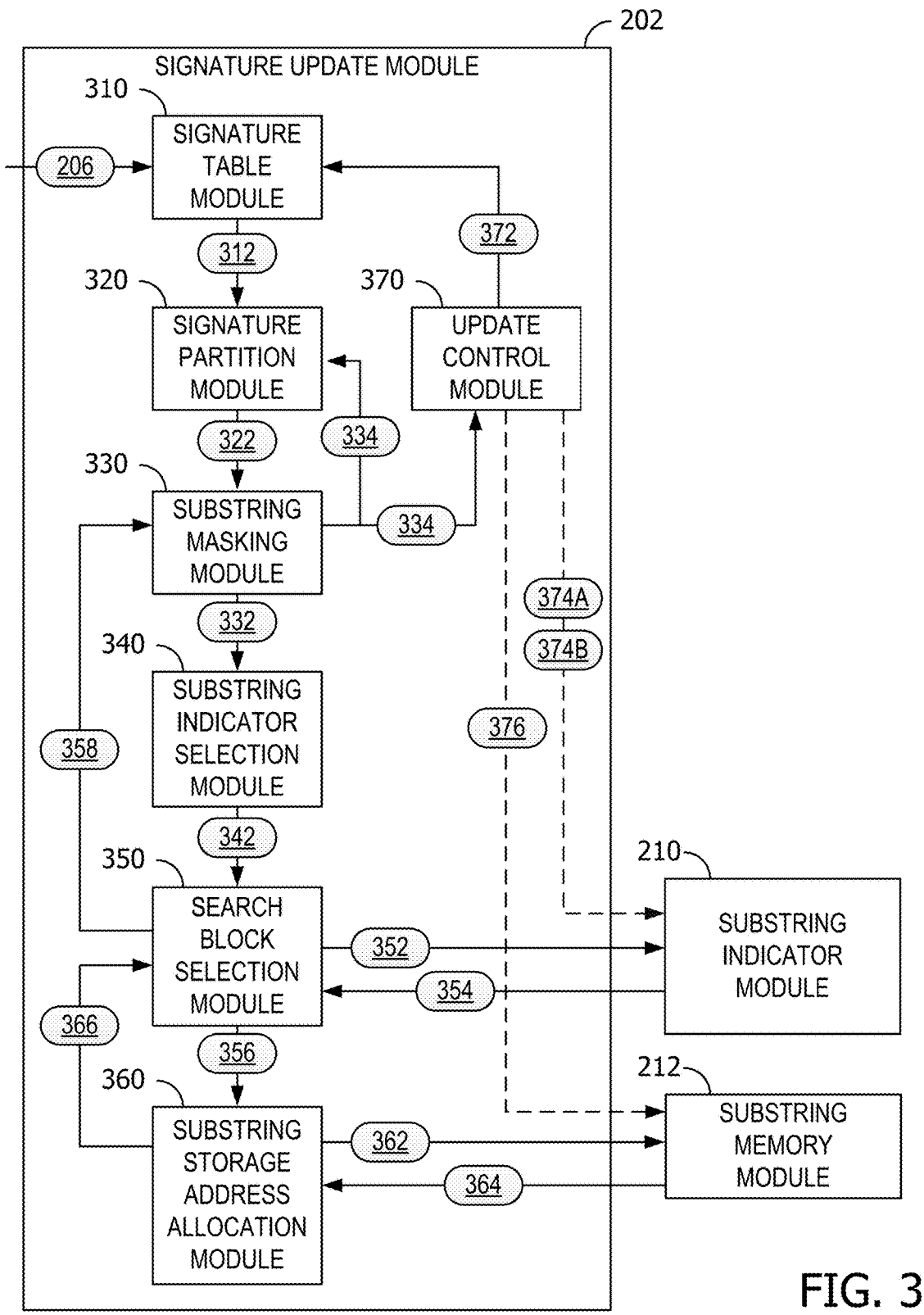

FIG. 3 is a diagram illustrating various example components of signature update module 202 and example data flow between those components. In the example embodiment, signature update module 202 includes a signature table module 310, a signature partition module 320, a substring masking module 330, a substring indicator selection module 340, a search selection module 350, an substring storage address allocation module 360, and an update control module 370.

Figure 4:
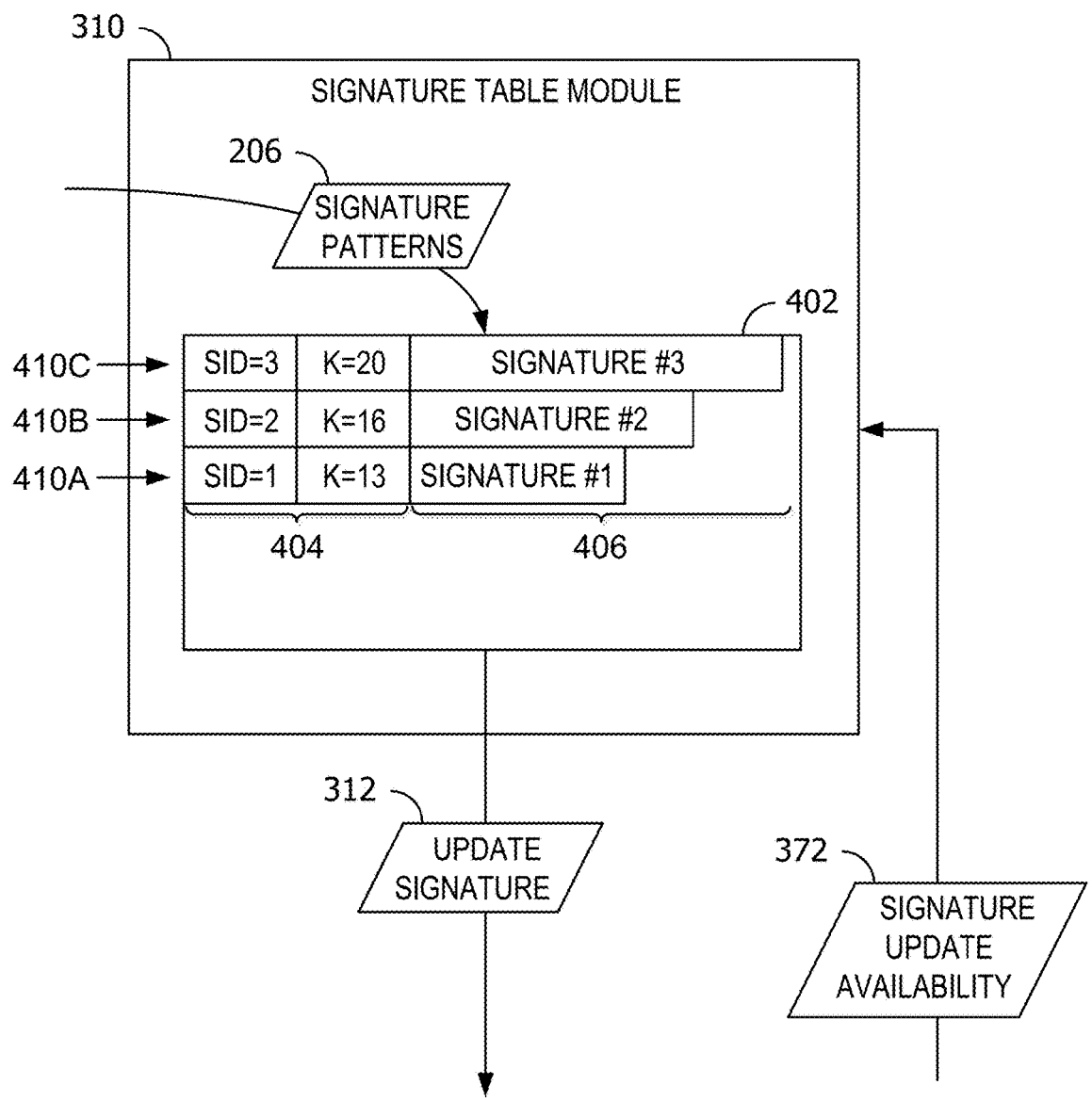

Signature table module 310 is configured to receive signature patterns 206 (e.g., from network management device 112 during a configuration operation such as a signature update process) and temporarily stage those signature patterns 206 (e.g., until they can be configured within search blocks module 210). FIG. 4 illustrates data flow and operation of signature table module 310 in greater detail. Signature table module 310 includes a signatures table 402. In some embodiments, signature table 402 is a memory that temporarily stores signatures 206 and associated data. In the example embodiment, signatures table 402 is implemented as a first-in/first-out (FIFO) queue. Signature table 402 stores each signature pattern 206 as an original signature string 406 (e.g., a number of bytes of a signature). In some embodiments, original signature string 406 may be a fixed strings of bytes (e.g., 20 bytes to be searched "as is").

Signature table 402 also stores metadata 404 about each original signature string 406, including a substring identifier, SID, (e.g., a unique identifier for each original signature string 406) and a length, K, of original signature string 406 (e.g., in bytes). In some embodiments, metadata 404 may be provided as a part of signature patterns 206. In other embodiments, any or all of metadata 404 may be determined by signature table module 310 (e.g., upon receipt of signature patterns 206). For example, signature table module 310 may determine a length of original signature string 406, or may assign a unique identifier (e.g., the SID) to signature pattern 206 upon receipt. In the example shown in FIG. 4, signature table 402 includes three original signature strings 406: a "Signature #1" with SID=1 and a length, K, of 13 bytes; a "Signature #2" with SID=2 and K=16 bytes; and a "Signature #3" with SID=3 and K=20 bytes. Each of the original signature strings 406 are fixed strings in this example.

During operation, and referring now to FIGS. 3 and 4, signature table module 310 receives one or more signature patterns 206 and creates a new entry in signature table 402 for each received signature pattern 206. As illustrated in FIG. 4, signature patterns 206 included three signatures 410A, 410B, 410C (collectively, signatures 410), each of which includes an original signature string 406, an SID, and a length, K, for each original signature string 406. Further, signature table module 310 awaits signature update availability 372 signal from update control module 370 that identifies when signature table module 310 may send a signature 410 for configuration. When signature update availability 372 is positive (e.g., indicating allowance to proceed with a signature update operation), signature table module 310 transmits an update signature 312 for the earliest signature 410 in signature table 402 (e.g., signature 410A) to signature partition module 320 for further configuration processing. Update signature 312 includes a signature 406 (e.g., "Signature #1") and may include associated metadata 404 (e.g., SID=1, K=13). As such, signature table module 310 acts as a staging point for incoming signature patterns 206 during a configuration operation.

Figure 5:
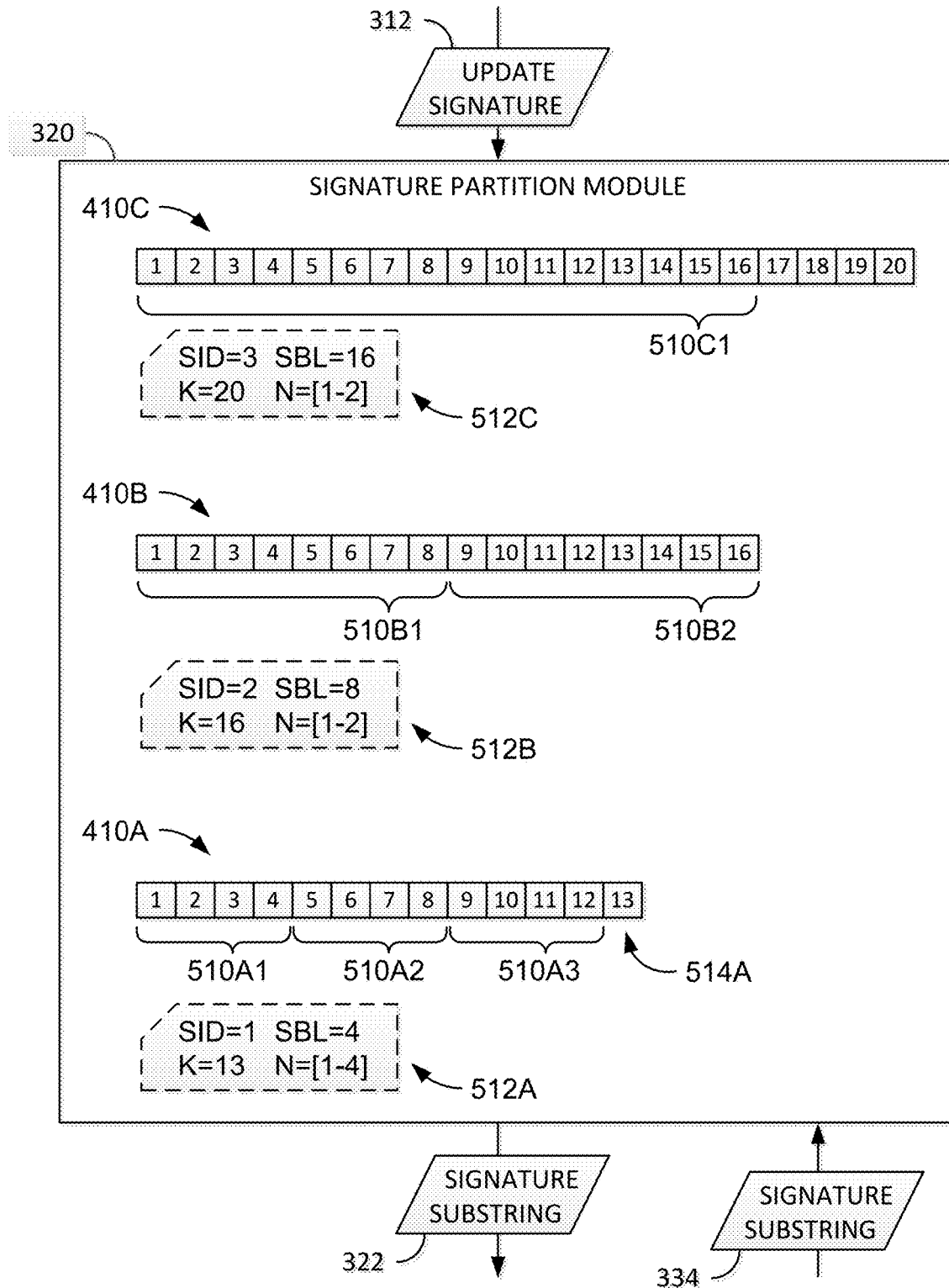

Referring now to FIG. 3, signature partition module 320 is configured to receive signature update 312 and prepare the associated original signature string 406 for configuration. In the example embodiment, signature partition module 320 partitions each received original signature string 406 into one or more signature substrings (or just "substrings") 322. The terms "substring" and "partition" may be used interchangeably herein in certain instances. FIG. 5 illustrates example results of data partitioning operations performed by signature partition module 320 on signatures 410. FIG. 5 illustrates each signature 410A, 410B, 410C separately, with each signature 410 being shown as a row of numbered bytes (e.g., 1 through K, where K is the total byte count for signature 410). Each signature 410 is partitioned into one or more substrings 510A1-A3, 510B1-B2, 510C1 (collectively, substrings 510 or partitions 510).

In addition, for purposes of discussion, FIG. 5 also illustrates metadata 512A, 512B, 512C (collectively, metadata 512) associated with each particular substring 510. Elements of metadata 512 include the SID and K values described above (e.g., as received with update signature 312). Elements of metadata 512 also include a substring length ("SBL") which identifies a length of substring used for substrings 510 partitioned from signature 410. In other words, SBL represents a partition length of substrings 510. Elements of metadata 512 also include a partition number, N, which represents a position identifier the substring 510 within the associated signature 410. N is a number between 1 and $N_{max}$, the total number of partitions into which signature 410 is divided. For example, partition 510A2 is the $2^{nd}$ partition of substring 410A, and thus N=2 for that substring.

During operation, signature partition module 320 partitions an update signature (e.g., signatures 410) into one or more substrings 510. In the example embodiment, signature partition module 320 utilizes three fixed-length SBLs (i.e., partition sizes): 4-byte partitions; 8-byte partitions; and 16-byte partitions. In other embodiments, other partition sizes and the numbers of partition sizes may be used. Here, and for example, signature 410A is divided into three substrings 510A1, 510A2, and 510A3 (collectively, 510A), which represent the first 12 bytes of signature 410A. In addition, signature 410A also includes a remainder 514A that represents a number of bytes not included as a part of one of the partitions 510A. Remainder 514A may, however, be counted as a partition (e.g., for purposes of number of partitions). Further, each substring 510A may be identified by N, its position within signature 410.

When partitioning signature 410, signature partition module 320 may utilize a smallest-first approach to determining which SBL to use. In the example embodiment, signature partition module 320 may attempt to use the smallest SBL (e.g., SBL=4 bytes). In other words, and for example, signature partition module 320 may start by partitioning signature 410A into 4-byte partitions, 510A1, 510A2, 510A3, and remainder 514A. Signature partition module 320 may then submit each of the substrings 510A (e.g., sequentially, as signature substrings 322) to substring masking module 330, which continues to process each of the substrings 510A (described in greater detail below).

Upon conclusion of the update process, substring masking module 330 reports back a substring update result 334 to signature partition module 320 and, in some cases (e.g., successes), also to update control module 370. If the update process for all of the substrings 510A were successful in being configured to search blocks module 210 and substring memory module 212, signature partition module 320 is considered to be finished with signature 410A. Some update attempts for substrings may, however, be unsuccessful. For example, update attempts may fail if a maximum usage of a particular search module has been met or exceeded (e.g., if one of the identified search modules is currently allocated to three other signature patterns 206).

If the update process for substrings 510A (e.g., as 4-byte partitions) was unsuccessful, signature partition module 320 (e.g., via instructions to modules 330, 340, 350, and 360) unconfigures any substrings 510A that were already successfully configured during this update (e.g., for this particular update signature 312) and re-partitions signature 410A using another SBL. In the example embodiment, if a 4-byte SBL partition is unsuccessful, signature partition module 320 repartitions signature 410A using the next highest SBL, the 8-byte SBL. If the 8-byte partitioning of signature 410A fails, then signature partition module 320 may repartition signature 410A using the 16-byte SBL. Only if the highest SBL also fails will a failure be reported back to update control module 370 and, thus, to signature table module 310 and out to the requester of the update. In other embodiments, signature partition module 320 may utilize a highest-first approach. For example, signature partition module 320 may start with the largest SBL available for a particular signature 410 and work down to smaller SBLs if the largest partitioning fails. For example, 16-byte partitioning is not available for signature 410A because $K_{410A}<16$ bytes. As such, an 8-byte partitioning may be initially used. If the 8-byte partitioning fails, then the next lower SBL, a 4-byte partitioning, may be used.

It should be understood that, while multiple signatures 410 are illustrated in FIG. 5 for purposes of illustration, signature partition module 320 receives and processes each signature 410 (e.g., as update signature 312) one at a time.

Referring again to FIG. 3, signature partition module 320 transmits signature substrings 322 to substring masking module 330 to continue the update process. At this stage, each substring 322 will be processed to yield multiple "keys" (also referred to herein as "substring indicators") that will be used as addresses of particular search modules within search blocks module 210. These substring indicators are generated by combining the bits of specific parts of each substring. The bits chosen from each character of the substring convey the correlations of the characters of that substring. In other words, particular bits of the substring 322 are used to generate an address for one or more particular search modules within an address space containing many search modules.

In embodiments that use a string or substring with a conventional hashing function to generate an address a particular search block, use of a conventional hashing function adds signal delays (e.g., particularly when performed on the inbound network traffic) that introduce an additional slowness to the pattern matching operation. Here, in the example embodiment, substring masking module 330 and substring indicator selection module 340 generate masked substrings 332 and substring indicators 342 to generate an address value directly from the bits of the substring 322 or masked substring 332 that acts as a hash into an address space in the search blocks module 210 (e.g., into one of the search blocks 810 shown in FIG. 8A or 9A). In such embodiments, no conventional mathematical hashing computation is performed to generate an address. Rather, substring indicators 342 are generated by assembling particular bits of the masked substring 332 (e.g., by signature update module 202 during configuration), or by assembling particular bits of network data (e.g., by signature search module 204 during operation).

Figure 6:
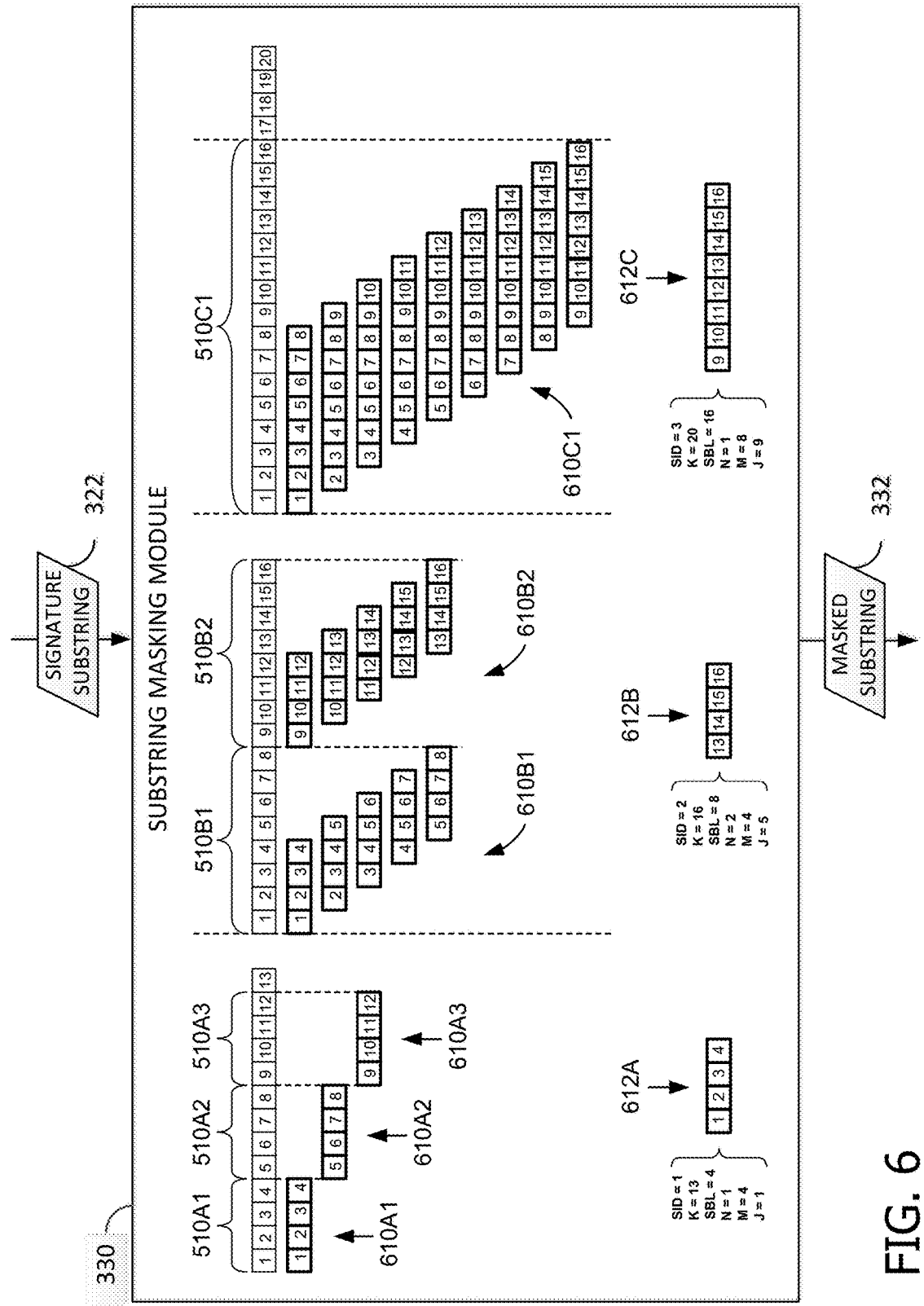

More specifically, substring masking module 330 is configured to receive signature substrings 322 and generate one or more masked substrings 332 from the signature substrings 322. The term "masked substring" refers to a portion of a particular substring. Each masked substring will be used to generate FIG. 6 illustrates example results of substring masking operations performed by substring masking module 330 based on substrings 510. Here, FIG. 6 shows each of the partitions 510 from signatures 410, as well as a set of one or more prospective masks 610A1-A3, 610B1-B2, 610C1 (collectively, prospective masks 610) for each partition 510. Substring masking module 330 identifies a selected mask (or just "mask") 612A, 612B, 612C (collectively, "masks 612"), one for each signature 410.

In the example embodiment, substring masking module 330 identifies one or more prospective masks 610 for each substring 510. Prospective masks 610 are identified as consecutive bytes of an order of length smaller than the length of the substring 510, where possible. In other words, in the example of 4-, 8-, and 16-byte substrings, an 8-byte mask length, "M", is used for 16-byte substrings, a 4-byte mask length is used for 8-byte substrings, and a 4-byte mask length is also used for 4-byte substrings (e.g., as there is no smaller length available).

In the example shown in FIG. 6, substrings 510A of signature 410A are 4 bytes in length and, as such, each substring 510A includes only one prospective mask 610A of 4 bytes in length (M=4). More specifically, substring masking module 330 identifies prospective mask 610A1 for substring 510A1, prospective mask 610A2 for substring 510A2, and prospective mask 610A3 for substring 510A3. With regard to substrings 510B of signature 410B, substrings 510B are 8 bytes in length and, as such, substring masking module 330 identifies five 4-byte prospective masks 610B1 for substring 510B1 and five 4-byte prospective masks 610B2 for substring 510B2 (M=4). Similarly, substring 510C1 is 16 bytes in length and, as such, substring masking module 330 identifies nine prospective masks 610C1 of 8 bytes in length (M=8).

For each substring 510 and associated set of prospective masks 610, substring masking module 330 selects one mask 612. In the example here, substring masking module 330 selects mask 612A (e.g., bytes 1-4 of substring 510A1) for substring 510A1, mask 612B (e.g., bytes 13-16 of substring 510B2) for substring 510B2, and mask 612C (e.g., bytes 9-16 of substring 510C1) for substring 510C1. It should be understood that only some masks 612 are shown in FIG. 6, and substring masking module 330 may similarly select masks 612 for other substrings 612 (e.g., substrings 510A2, 510A3, 510B1).

In these examples, "J" represents the byte offset (e.g., staring byte) of the selected mask 612 within the substring 510, with M identifying how many bytes from that starting position, J, the mask includes. As such, J may be between 1 and $J_{max}$, the total number of contiguous-byte prospective masks 610 possible given a particular SBL and M. In other words, 1≤max≤(SBL−M+1). As such, the prospective masks 610 within each substring 510 may be referenced herein using their associated J value. For example, the prospective mask of bytes 3-6 of substring 510B1 (e.g., of prospective masks 610B1) may be referred to as the third prospective mask, as J=3 for that particular prospective mask.

In the example embodiment, the first prospective mask within each set of prospective masks 610 (e.g., for each signature 410) is initially selected as the associated selected mask 612 for that signature 410. For example, upon receiving substring 510A1 as signature substring 322, substring masking module 330 identifies and selects the one prospective mask 610A1 as mask 612A, as there is only one prospective mask 610A1. Upon receiving substring 510B2 as signature substring 322, substring masking module 330 identifies the five prospective masks 610B2 and, in this example, selects the fifth prospective mask (e.g., J=1, bytes 13-16) of substring 510B2 as mask 612B.

Figure 7A:
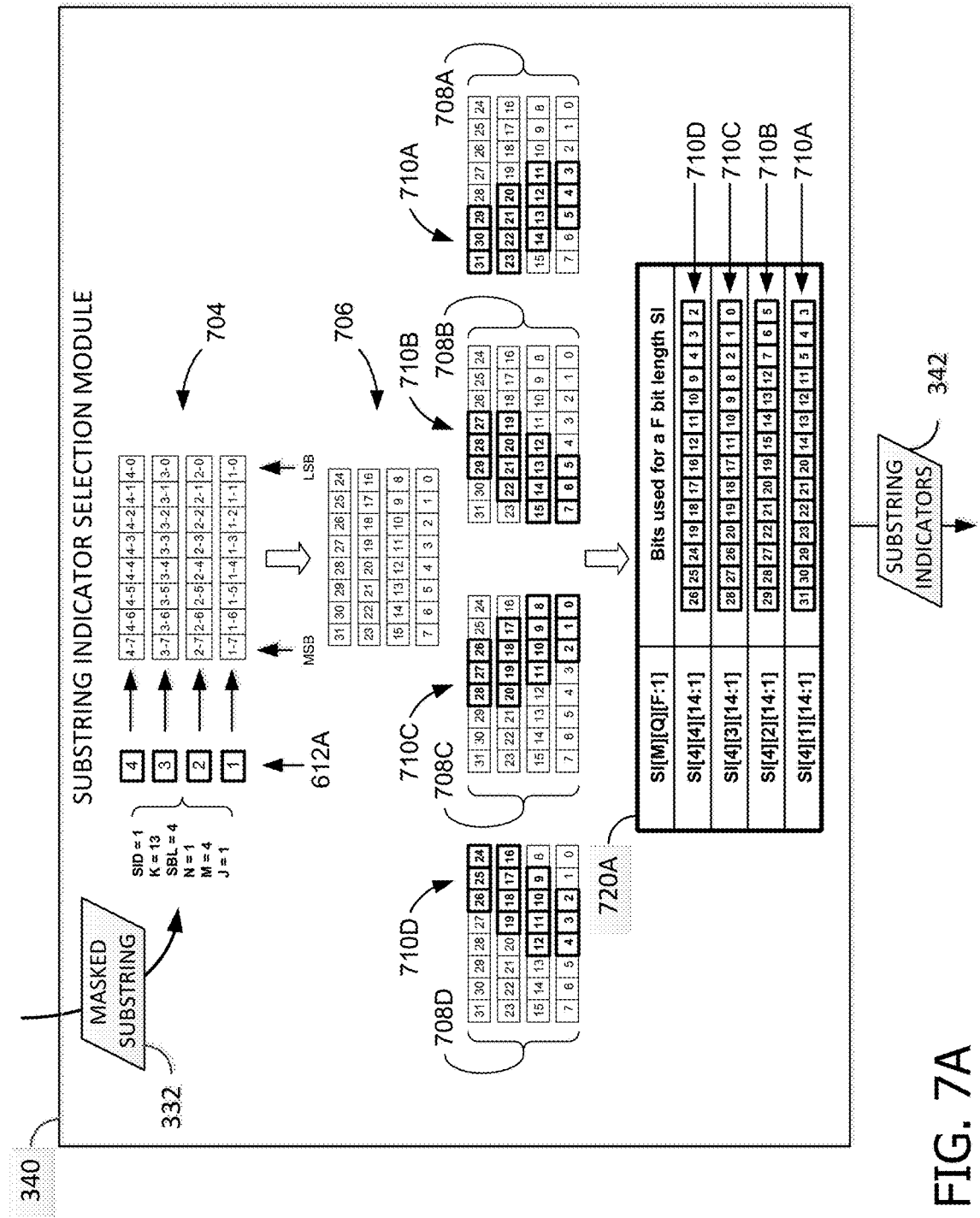
FIGS. 7A-7C illustrate various example embodiments in which substring indicator selection module generates substring indicators for the example masked substrings identified in FIG. 6, where each substring indicator is a particular set of bits of the given masked substring.
Figure 7B:
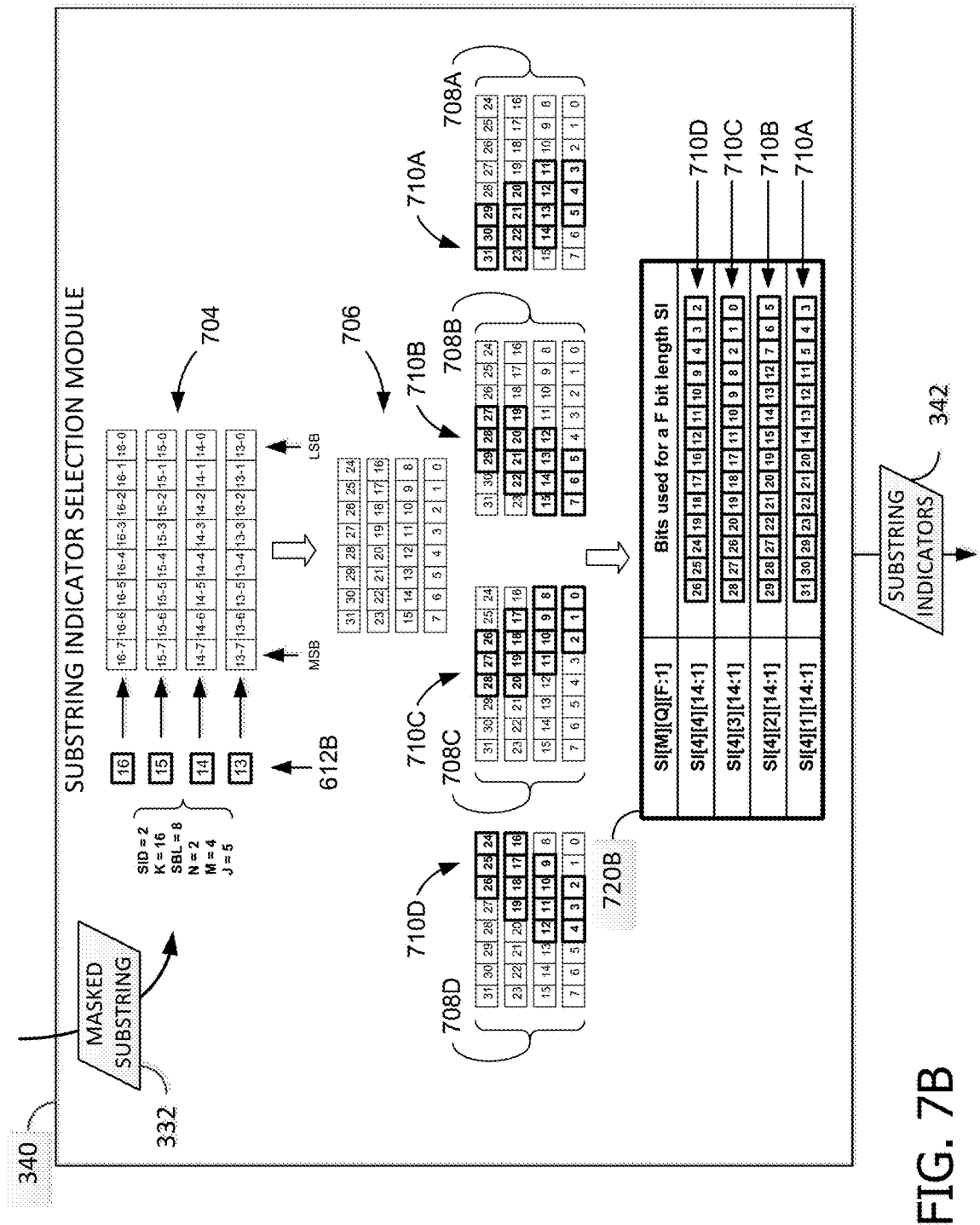
Figure 7C:
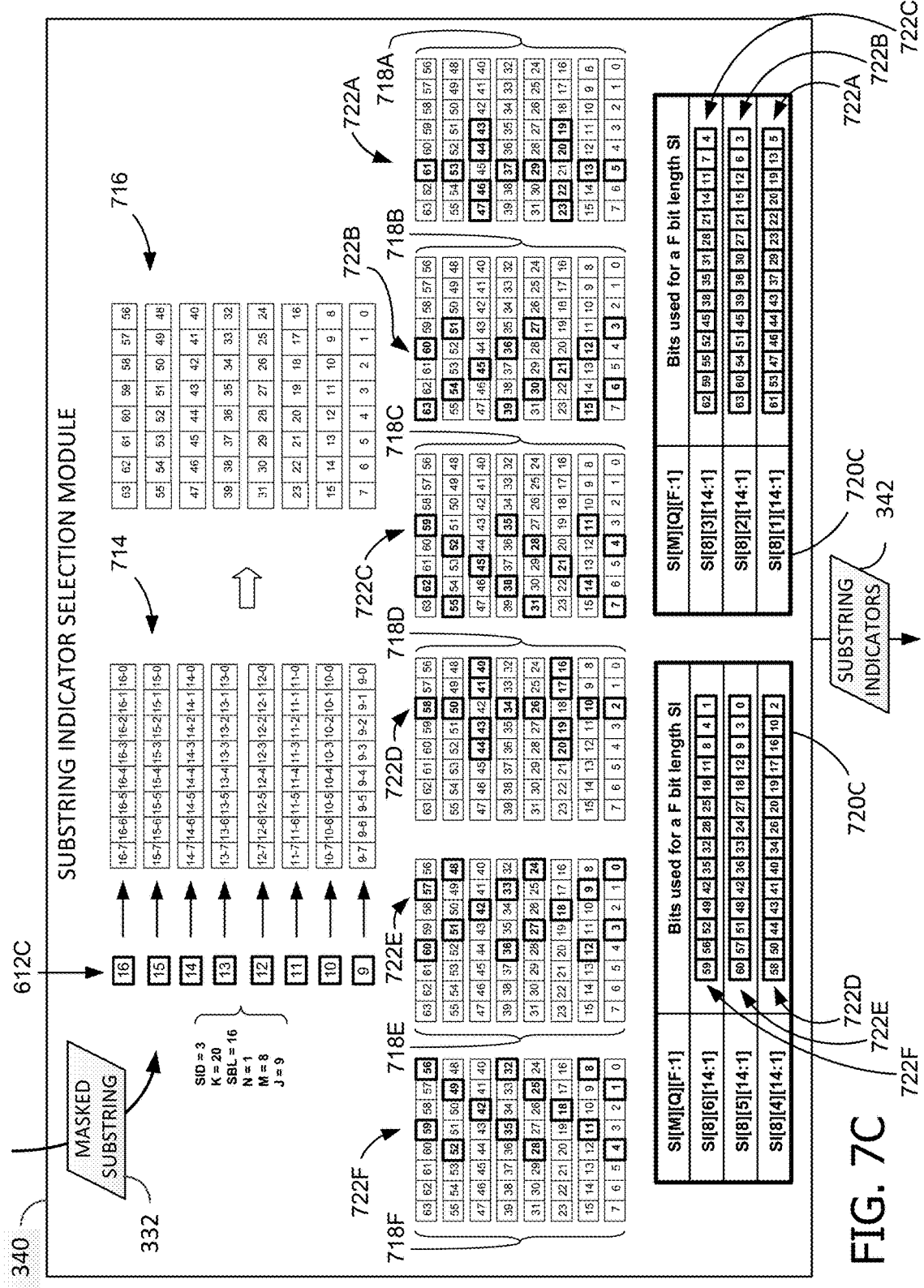

Referring again to FIG. 3, upon selecting a particular mask 612 from the set of prospective masks 610 for a given signature substring 322 (e.g., substring 510), substring masking module 330 transmits the signature substring 322 and mask 612 as masked substring 332 to substring indicator selection module 340. Masked substring 332 includes the data associated with the signature substring 322 (e.g., the bytes of the substring and associated metadata) as well as the data associated with the selected mask 612. Substring indicator selection module 340 is configured to generate a set of Q substring indicators ("SI") 710 for a particular substring 510 and mask 610. FIGS. 7A-7C illustrate various example embodiments in which substring indicator selection module 340 generates sets of substring indicators 720A, 720B, 720C (collectively, sets of substring indicators 720) for the example masked substrings 332 identified in FIG. 6, where each set of substring indicators 720 includes multiple individual substring indicators 710, 722, each of which comprise a particular set of bits of the given masked substring 332.

In FIG. 7A, substring indicator selection module 340 generates the set of substring indicators 720A for substring 510A1 using mask 612A. More specifically, substring indicator selection module 340 receives mask 612A and associate data as masked substring 332. Mask 612A includes four bytes, "1", "2", "3", and "4", as illustrated in FIG. 7A. For purposes of illustration, FIG. 7A illustrates the bits of each byte of mask 612A in a bit table 704. As shown, each bit in bit table 704 is labeled as "x-y", where x is the particular byte of mask 612A and where y is the bit within that byte, and where the $0^{th}$ bit is the least significant bit (LSB) of the byte and the $7^{th}$ bit is the most significant bit (MSB) of the byte. In another representation, the bits of mask 612A are also presented in an ordinal bit table 706. In the ordinal table 706, each bit of mask 612A is numbered from the least significant bit (e.g., the first bit of byte "1") to the most significant bit of each byte (e.g., the seventh bit of byte "1"), and from the lowest byte (e.g., byte "1") to the highest byte (e.g., byte "4"). The ordinal bit numbers for each bit (e.g., the numbers in each of the respective squares of ordinal bit table 706) are used to illustrate the creation of set of substring indicators 720A.

During operation, substring indicator selection module 340 selects various bits of mask 612A to use to create set of substring indicators 720A. More specifically, in this example, substring indicator selection module 340 uses four "bit masks" 708A, 708B, 708C, 708D (collectively, "bit masks 708"). Each bit mask 708 identifies a set of mask bits 710A, 710B, 710C, 710D within four bytes. In FIG. 7A-7C, bit masks 708 are illustrated using ordinal bit numbers (e.g., as in ordinal table 706), where the masked bits are bold bordered. It should be understood that bit table 704 and ordinal table 706 are presented here for purposes of illustration, and substring indicator selection module 340 may utilize primitive computational operations to generate substring indicators 710 from mask 612A, such as bitwise operations.

Substring indicator selection module 340 utilizes bit masks 708 in conjunction with bit table 704 for the four bytes of mask 612A to create the set of substring indicators 720A. Set of substring indicators 720A include substring indicators 710A, 710B, 710C, and 710D (collectively, substring indicators 710), each of which are constructed from one of the bit masks 708 (e.g., "SI[4][Q]", where Q is the Qth substring indicator for the masked substring 332, ranging between 1 and $Q_{max}$, the number of bit masks 708 used to build the set of substring indicators 720A). In other words, each row SI[4][Q] represents a single substring indicator 710, each being associated with one of the bit masks 708 that includes 14 bits, where "F=14." In this example, SI[4][1] is associated with bit mask 708A, SI[4][2] is associated with bit mask 708B, SI[4][3] is associated with bit mask 708C, and SI[4][4] is associated with bit mask 708D. Substring indicator selection module 340 builds each substring indicator 710 with particular bits of the masked substring 332 as indicated by the associated bit mask 708. For example, SI[4][1] includes bits 31, 30, 29, 23, 22, 21, 20, 14, 13, 12, 11, 5, 4, and 3 of bytes 1, 2, 3, and 4 from mask 612A. Similarly, SI[4][2] includes bits 29, 28, 27, 22, 21, 20, 19, 15, 14, 13, 12, 7, 6, and 5 of bytes 1, 2, 3, and 4 from mask 612A, and so forth for rows 3 and 4.

In FIG. 7B, substring indicator selection module 340 generates a set of substring indicators 720B for substring 510B2 using mask 612B. Mask 612B includes four bytes, "13", "14", "15", and "16", as illustrated in FIG. 7B. In this example, substring indicator selection module 340 similarly utilizes bit masks 708 to generate four substring indicators 710. While substring indicator selection module 340 may be using the same bit masks 708 as described above with respect to FIG. 7A, it should be understood that the resulting substring indicators 710 differ from the set of substring indicators 720A because the mask 612 used to generate each set of substring indicators 720 differs.

In FIG. 7C, substring indicator selection module 340 generates a set of substring indicators 720C for substring 510C using mask 612C. Mask 612C includes eight bytes, "9" through "16", as illustrated in FIG. 7C. In this eight-byte mask example, and again for purposes of illustration, FIG. 7C illustrates the bits of each byte in a bit table 714 (e.g., as an 8-byte bit table). As shown, each bit in bit table 714 is labeled as "x-y", where x is the particular byte of mask 612C and where y is the bit within that byte, and where the $0^{th}$ bit is the least significant bit (LSB) of the byte and the $7^{th}$ bit is the most significant bit (MSB) of the byte. In another representation, the bits of mask 612C are also presented in an ordinal bit table 716 (e.g., also as an 8-byte ordinal bit table). In the ordinal bit table 716, each bit of mask 612C is numbered from the least significant bit (e.g., the first bit of byte "9") to the most significant bit of each byte (e.g., the seventh bit of byte "9"), and from the lowest byte (e.g., byte "9") to the highest byte (e.g., byte "16"). The ordinal bit numbers for each bit of mask 612C (e.g., the numbers in each of the respective squares of ordinal bit table 716) are used to illustrate the creation of six substring indicators 720.

For eight-byte masks (e.g., like mask 612C), substring indicator selection module 340 uses six bit masks 718A, 718B, 718C, 718D, 718E, and 718F (collectively "bit masks 718"), each having associated sets of masked bits 722A, 722B, 722C, 722D, 722E, and 722F (collectively, "masked bits 720"), respectively. Each set of masked bits 722 includes 14 bits (F=14). Further, based on the six bit masks 718, the resulting set of substring indicators 720C include six substring indicators 722, also labeled as SI[8][1-6], as shown.

In some embodiments, substring indicator selection module 340 determines which bit masks 708 to use based on the size of mask 612B. In the example embodiment, substring indicator selection module 340 utilizes four bit masks 708 for four-byte masks 612A, 612B and six bit masks 718 for eight-byte masks 612C. In some embodiments, substring indicator selection module 340 may utilize one, two, or three bit masks 708 for four-byte or eight-byte masks 612. Since the substring indicators 342 are built as described herein (e.g., from particular bits of a substring), substring indicators 342, in some sense, represent a cross-section of the underlying substring from which they were constructed. Since only a subset of bits of the masked substring 612 are used, many other substrings may also possibly share the same substring indicator. As such, when only one substring indicator is used for indicating on a particular substring, that substring indicator may alert to the masked substring 332 relatively often (e.g., yielding "false positives," when the actual data does not fully match the substring even though it did yield the particular substring). The use of multiple substring indicators 342, as shown here, may reduce the number of false positives by correlating the occurrence of multiple substring indicators 342 for a particular substring. For example, with use of four substring indicators 342, such as used in four-byte masks 612, the underlying substring will only be indicated as potentially present in a given segment of data when all four substring indicators 710 for that masked substring 612 are identified in the segment of data. Further, a set of bit masks 718 that utilizes more, most, or all of the bits of a particular masked substring 332 tend to lead to less false positives than a set of bit masks that uses fewer of the bits of the substring (e.g., where some bits may not be included in any of the substring indicators 722, those bits would not be inspected, and thus expose potential for false positives).

Figure 8A:
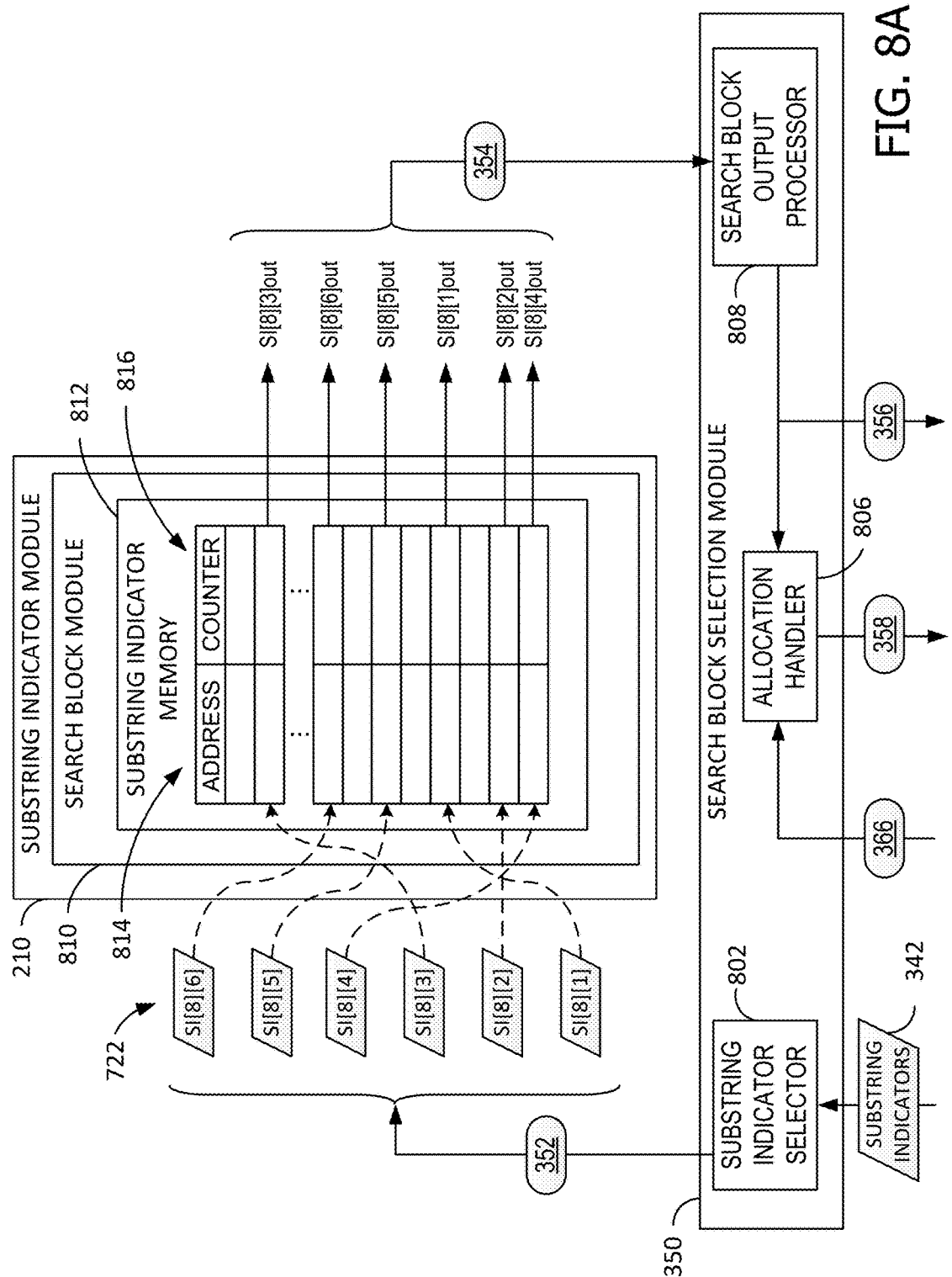
FIG. 8A illustrates a search block selection process performed by search block selection module.

Referring again to FIG. 3, upon constructing the set of substring indicators 720 for a particular masked substring 332, substring indicator selection module 340 transmits the signature substring 322, mask 612, and substring indicators 720 as substring indicators 342 to search block selection module 350. Substring indicators 332 includes the data associated with the signature substring 322 (e.g., the bytes of the substring and associated metadata) as well as the data associated with the selected mask 612 and substring indicators 710 or 722. FIG. 8A illustrates a search block selection process performed by search block selection module 350. Search block selection module 350, in the example embodiment, performs two primary functions during configuration. In some embodiments, substring indicator module 210 includes multiple search block modules 810, and search block selection module 350 determines which search block module(s) 810 are to be used for this signature substring 322. In addition, search block selection module 350 uses substring the six indicators 722, or the four substring indicators 710 in four-byte embodiments, as addresses within substring indicator memory 812 of a search block module 810 to determine whether or not each substring indicator 722 is available for allocation (e.g., prior to configuration). In the example shown here, substring indicator module 210 includes a single search block module 810 and search block selection module 350 evaluates the six substring indicators 722 for the 8-byte mask 612C of FIG. 7C.

More specifically, in the example embodiment, search block selection module 350 includes a substring indicator selector 802, an allocation handler 806, and a search block output processor 808. Substring indicator selector 802 receives substring indicators 342 from substring indicator selector module 340 which, in this example, includes the six substring indicators 722 from the set of substring indicators 720C, which are associated with the $9^{th}$ masked substring 612C of substring 510C1 (e.g., SID=3, K=20, SBL=16, N=1, M=8, J=9), as illustrated in FIGS. 6 and 7C (e.g., a six substring indicator mask). This process can similarly be performed with any number of substring indicators, such as with a four substring indicator mask as shown in FIGS. 7A and 7B, or with multiple search block modules 810.

Figure 8B:
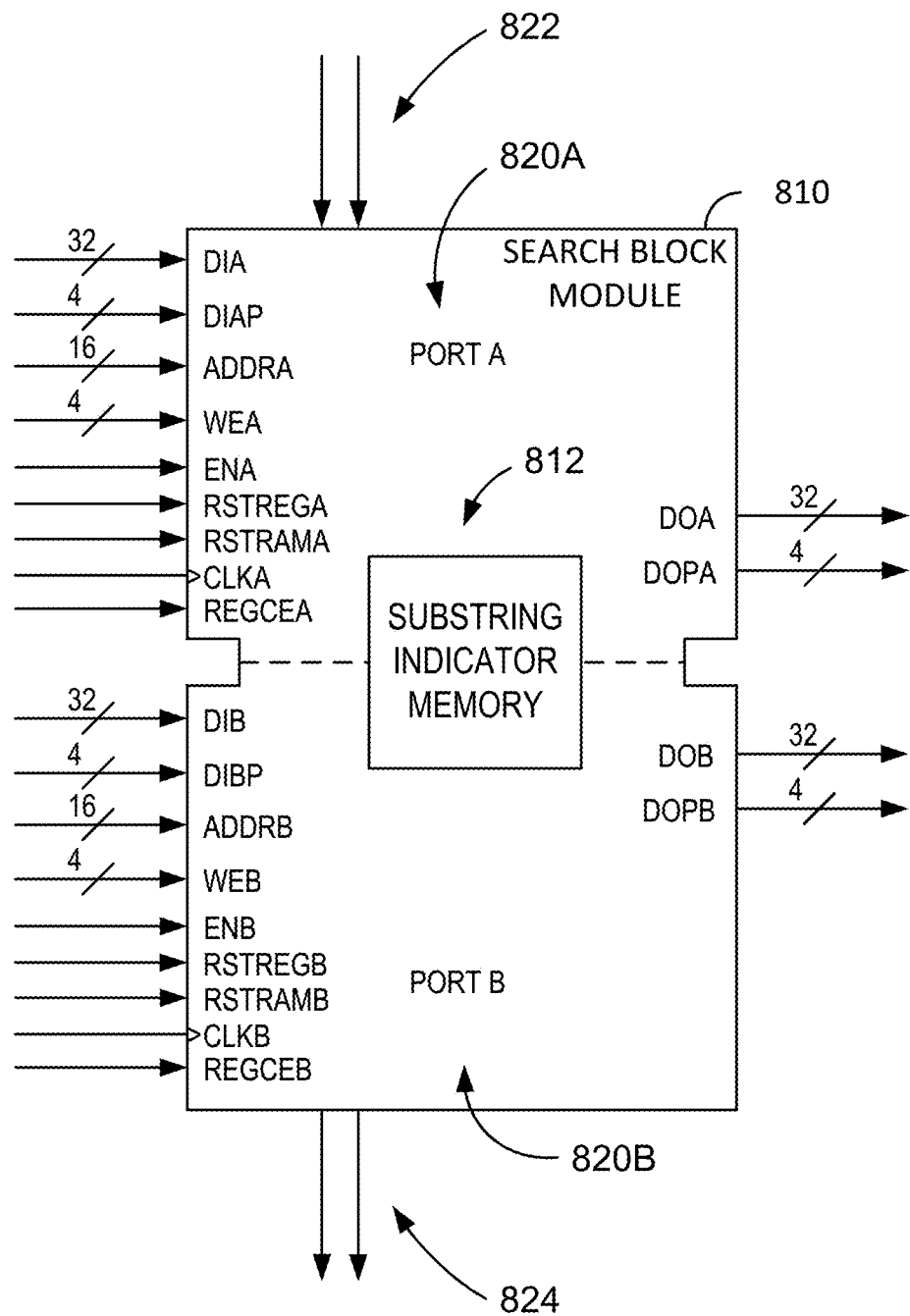
FIG. 8B is an I/O diagram illustrating an example embodiment in which search block module is a dual-port block RAM module of an FPGA.

In this example, search block module 810 is a block random-access memory (RAM) module of a field-programmable gate array (FPGA), and search block module 810 includes a memory array referred to here as substring indicator memory 812. FIG. 8B is an I/O diagram illustrating an example embodiment in which search block module 810 is a dual-port block RAM module of an FPGA, such as those made commercially available by Xilinx, Inc. of San Jose, Calif. (a Delaware corporation). For example, in one embodiment, search block module 810 may be single- or dual-port block RAM. Such FPGAs provide configurability and logical elements, such as multiple block RAM modules, that may be configured to perform various operations described herein.

In the example embodiment, search block module 810 is a RAMB36 dual-port block RAM of a Virtex-6 FPGA that includes a port A 820A and a port B 820B (collectively, ports 820). Ports 820 each include a separate set of inputs, such as a data input (DI) bus, a data input parity (DIP) bus, an address (ADDR) bus, a byte-wide write enable (WE), a clock input (CLK), and so forth. Ports 820 also each include a separate data output (DO) bus and a data output parity (DOP) bus. Further, each port 820 also includes cascade inputs 822 and cascade output 824. Substring indicator memory 812, in this example, is a 36 kB memory array. In other embodiments, search block module 810 may be a single-port block RAM FPGA.

Returning to FIG. 8A, substring indicator selector 802 uses the six substring indicators 722A-722F as addresses 814 within substring indicator memory 812 of search block module 810. Substring indicator memory 812 is a memory region provided by search block module 810 having at least a 14-bit addressable memory space (e.g., based on the 14-bit addresses embodied by substring indicators 722). In this example, each byte of substring indicator memory 812 is individually addressable and, as such, substring indicator memory 812 is at least $2^{14}$ or 16 kilobytes (k) in size. In other embodiments, address space for substring indicator memory 812 may be increased or decreased to support varying sizes of memory by using different bit length substring indicators 710, 722 and corresponding different bit masks 708, 718 (e.g., 15-bit addresses 814 for 32k memory, 16-bit addresses 814 for 64k memory, and so forth).

At each address 814 of substring indicator memory 812 is a byte of data. In the example embodiment, each byte of data is used as a counter 816 for the associated substring indicator 722 (e.g., based on that byte's own address 814). During configuration, when a particular substring indicator 722 is generated and used for a particular masked substring 332, the counter 816 at the address 814 identified by the substring indicator 722 is incremented. Similarly, if that substring indicator 722 is later removed, the same counter 814 is decremented. During operation, the status of the counter 816 at address 814 is examined whenever an inbound substring is encountered that generates that same substring indicator 722. If, at such time, the counter 816 is non-zero, then at least one configured signature is using that substring indicator. However, any given inbound string may generate multiple substring indicators (e.g., a set of four or six substring indicators, for 4-, 8-, or 16-byte inbound substrings). When all of the substring indicators 722 for a given masked substring 332 are generated by the inbound substring, then all six of the counters 816 for that particular set of substring indicators 710C (e.g., all six substring indicators 722) are examined. If all of the counters 816 are non-zero, then the inbound substring is identified as potentially containing the masked substring 332.

Returning to the configuration operations illustrated in FIG. 8A, substring indicator selector 802 transmits allocation requests 352 to search block module 810 of substring indicator module 210, including each of the six addresses 814 identified by the substring indicators 722. Each 14-bit address 814 of search block modules 810 is also illustrated with notation SI[8][q] of substring indicators 722 in FIG. 8, where q is the $q^{th}$ substring indicator 722 provided in substring indicators 342. Allocation requests 352 are received by search module 810.

In embodiments where search block module 810 includes a single port interface, input bus DIA of search block module 810 is occupied by signature update module 202 during the signature update process (e.g., when signature detection engine 102 or network security device boots or restarts, or when signatures are added or deleted during operation). During operation, when live data is used to access search block module 810, the information stored in search block module 810 is examined and used to determine if the live data matches the stored substring. In the example embodiment, where search block module 810 includes a dual port interface, one port (e.g., port A 820A) may be used for the signature updating process and the other port (e.g., port B 820B) may be used to receive the live data.

Upon receipt of allocation request 352, search block module 810 accesses the counters 816 at each address 814 identified by substring indicators 722 and transmits the counter value as an allocation result 354 to search block output processor 808 (represented here as SI[8][n]out). If a particular counter 816 of search block module 810 holds logical HIGH value with limited usage (e.g., less than or equal to a pre-determined threshold, such as three), then search block selection module 350 considers those memory spaces as available. In other words, a particular substring indicator 722 is considered available to accommodate the current configuration request if that substring indicator 722's counter 816 is less than or equal to a "maximum substring indicator configuration threshold" of three. In some embodiments, the threshold value may be any number below ten or any number below twenty. In some embodiments, signature detection engine 102 may allow network administrator 114 to configure or change this threshold value.

In the example embodiment, substring indicators 722 may be limited, by the maximum substring indicator usage threshold, in terms of how many times they may be used to indicate various substrings. It may be beneficial to limit how many times a particular substring indicator 722 is used because if, for example, a particular substring indicator 722 is used too often (e.g., to indicate on dozens of different substrings), then that particular substring indicator 722's use as an indicator for any particular string is diminished. As such, limiting the number of times a particular substring indicator 722 is used will force the signature update module 202 to try configuring other substring indicators 722 for a signature, thus avoiding this "stacking" problem.

Continuing the example in FIG. 8A, allocation request results 354 are transmitted to search block output processor 808. If each of the substring indicators 722 are available for accepting an additional allocation (e.g., below the maximum substring indicator configuration threshold), then search block output processor 808 relays allocation results 354 to substring storage allocation module 360 as search block assigned status 356 to continue the allocation examination process. If, on the other hand, one or more of the substring indicators 722 are not available for accepting another allocation, then search block selection module 350 transmits a failure signal as allocation result 358 to substring masking module 330.

Figure 9A:
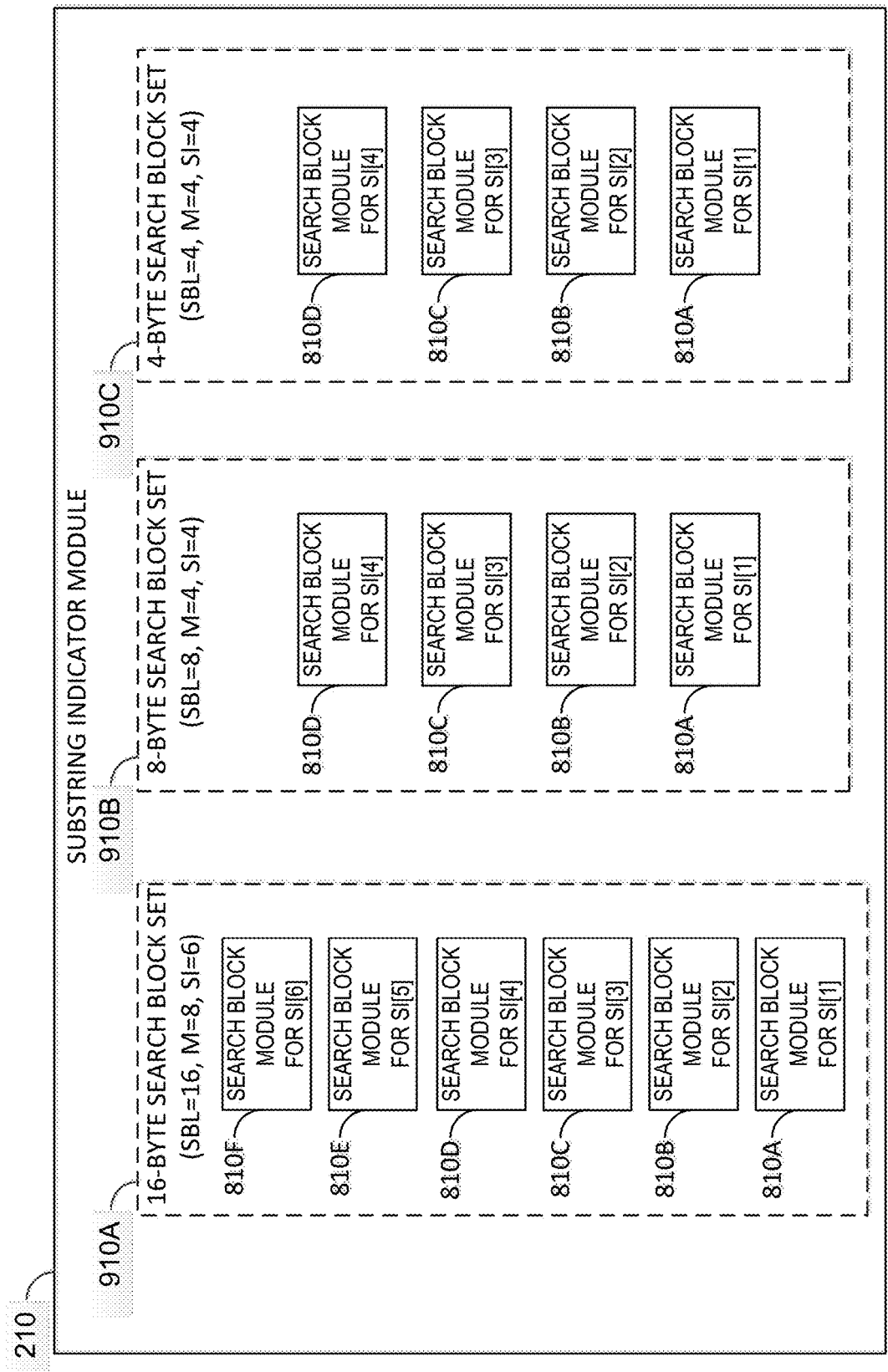
FIGS. 9A and 9B illustrate additional embodiments in which substring indicator module includes multiple search block modules.
Figure 9B:
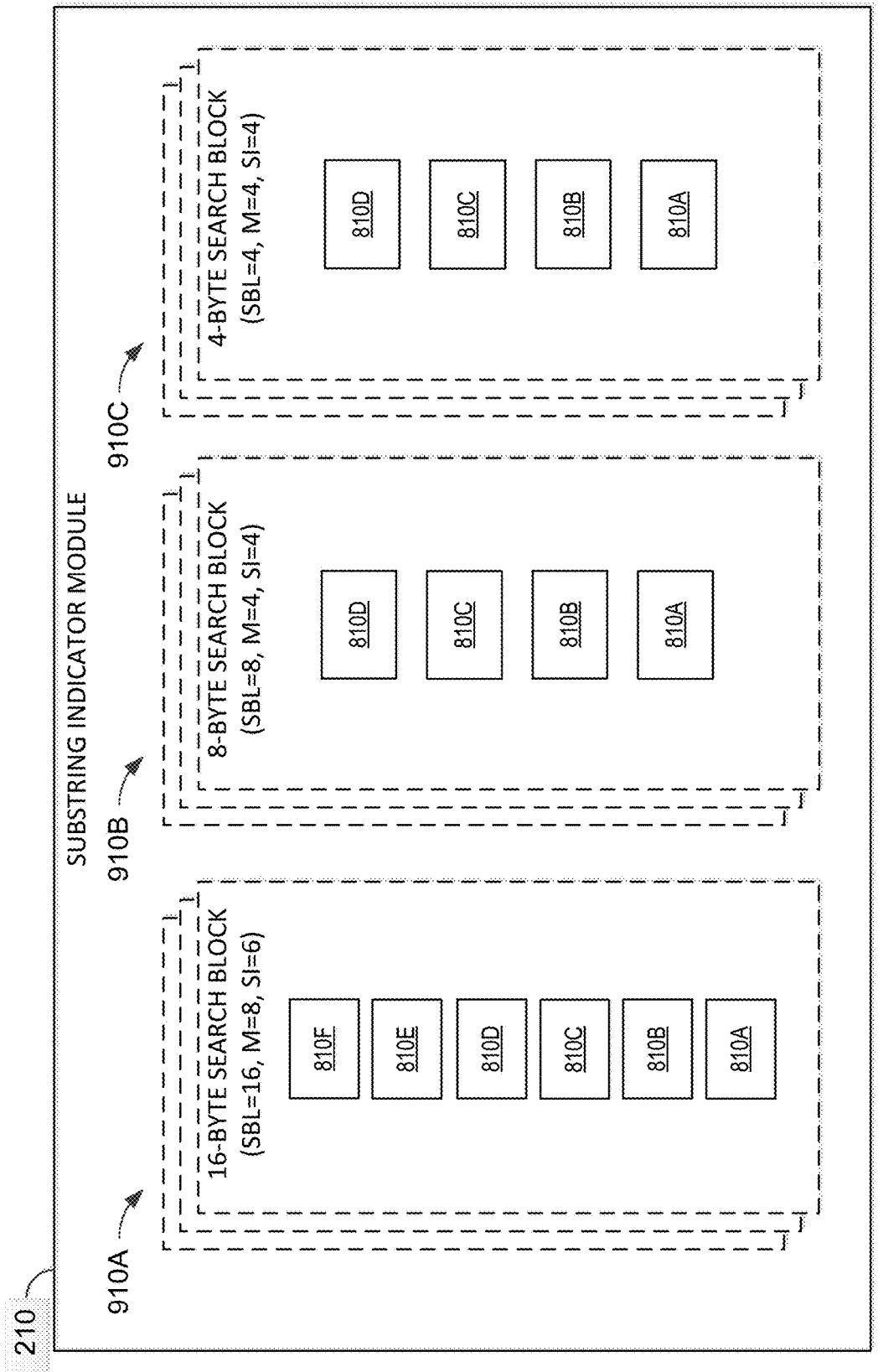

FIGS. 9A and 9B illustrate additional embodiments in which substring indicator module 210 includes multiple search block modules 810. In the example shown in FIG.

9A, substring indicator module 210 includes three search block sets 910A, 910B, 910C (collectively, search block sets 910). Each search block set 910 is assigned to a particular type of substring. Search block set 910A is configured to support substring indicators for 16-byte substrings (e.g., SBL=16, M=8, SI=6). Search block set 910B is configured to support 8-byte substrings (e.g., SBL=8, M=4, SI=4). Search block set 910C is configured to support 4-byte substrings (e.g., SBL=4, M=4, SI=4). Each search block set includes multiple search block modules 810, with each search block module 810 being assigned to a particular substring indicator SI[q]. For example, search block set 910A supports six substring indicators SI[1-6], and thus has six search block modules 810A-810F, one for each of the six substring indicators SI (e.g., search block module 810A supports the first substring indicator SI[1], search block module 810B supports the second substring indicator SI[2], and so forth).

During configuration, each of the four substring indicators 710 or six substring indicators 722 are configured onto a particular search block set 910 (e.g., based on the length of the substring), and further onto particular search block modules 810 within that search block set 910 (e.g., based on the number of the SI within the set of substring indicators 720). During operation, inbound substrings are sent to particular search block sets 910 (e.g., based on the size of the substring), and to particular search block modules 810 within that search block set 910 (e.g., based on the number of the SI within the set of substring indicators).

In the example shown in FIG. 9B, substring indicator module 210 includes multiple search block sets 910 for each particular type of substring (e.g., multiple 16-byte search block sets 910A, multiple 8-byte search block sets 910B, and multiple 4-byte search block sets 910C). During configuration, search block selection module 350 selects which particular search block set 910 is to be used for a particular substring or for a particular signature. In some embodiments, search block selection module 350 may implement a round-robin scheme between, for example, each of the 16-byte search block sets 910A. In some embodiments, when a particular allocation request fails to allocate on one search block set 910A, search block selection module 350 may attempt to allocate the same masked substring 612 on another search block set 910A (e.g., with the same substring indicators). During operation, since a given substring may be configured on any one of the search block sets 910 of a given size, inbound substrings of a particular size are sent to each of the search block sets associated with that particular size.

Adding additional search block modules 810, such as in the examples shown in FIGS. 9A and 9B, may provide additional capacity or improved performance for the signature detection engine. For example, in a single search block module 810 configuration, adding hundreds or thousands of signatures and all of their associated substrings may cause a single search block module 810 to become congested, which may eventually cause a subsequent signature configuration to fail. Adding additional search block modules 810 and associated methods to accommodate multiple search block modules 810 can allow the signature detection engine 102 to support a greater number of signatures.

Figure 10:
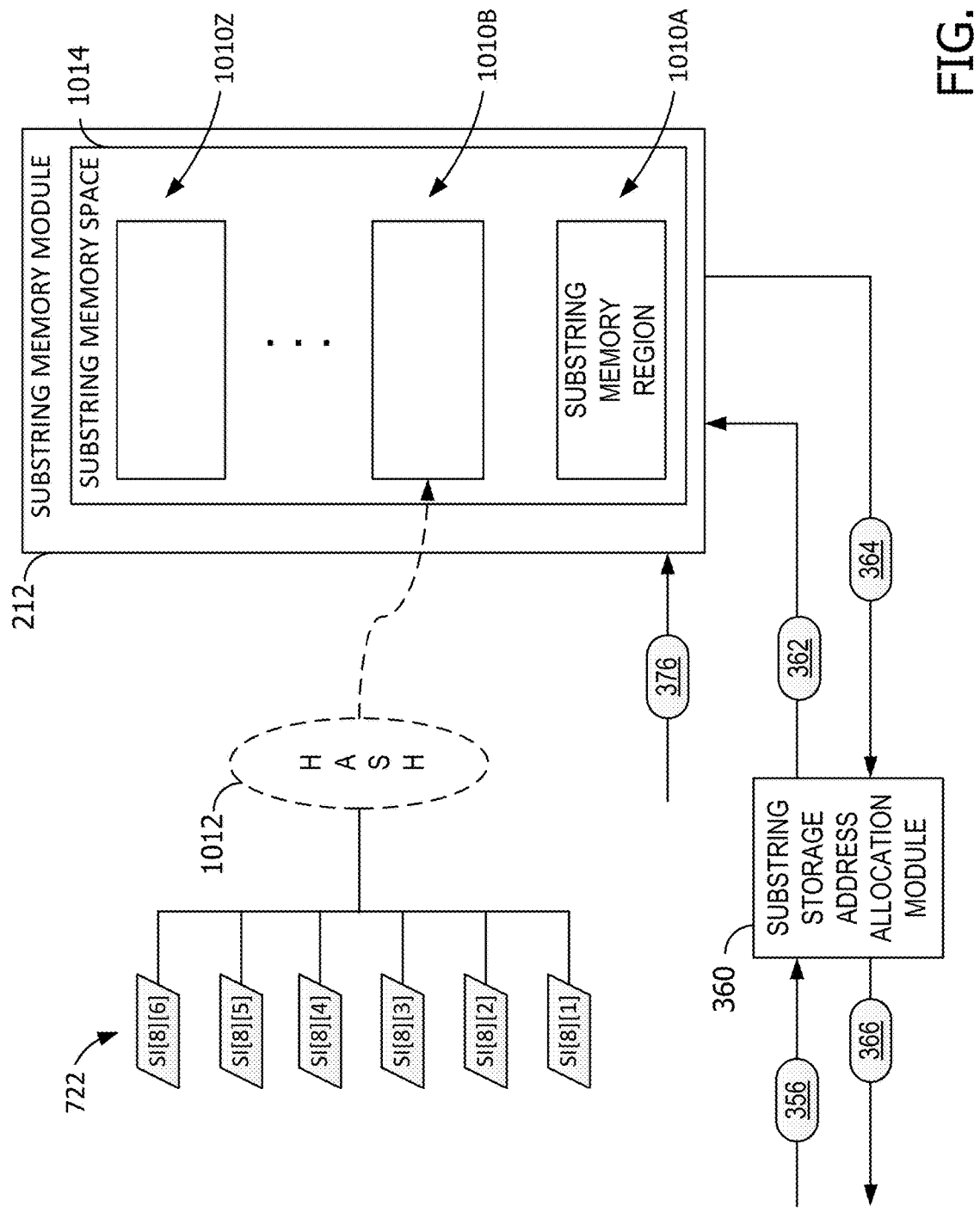

Referring again to FIG. 3, substring storage address allocation module 360 receives search block assigned status 356 from search block selection module 350. When search block assigned status 356 is positive (e.g., when all of the identified substring indicators 722 are available to accommodate allocation request 352), substring search address allocation module 360 generates addresses within substring memory module 212 to check availability of a memory space to hold signature substring 510 and associated signature data. FIG. 10 illustrates a memory allocation process performed by substring storage address allocation module 360. In the example embodiment, substring storage address allocation module 360 hashes the substring indicators 342 to generate an address to a particular substring memory region 1010A-1010F (collectively, "substring memory regions 1010") within a substring memory space 1014 of substring memory module 212. Substring storage address allocation module 360 determines whether substring a memory region 1010 is available for allocation for the signature substring 322. Each substring memory region 1010 stores the signature substring 322 and associated data. During searching operations, when a particular incoming substring matches on all four or six substring indicators of a particular substring 322 (e.g., indicating that the incoming substring may match that substring 322), then the full signature substring 322 from substring memory region 1010B may then be used to determine whether the incoming substring actually matches the full signature substring 322. Since there may potentially be other possible substrings that match on the same four or six substring indicators 710, 722, detection of the four or six substring indicators 710 alone may not be sufficient. As such, detection of a match to the four or six substring indicators 722 acts as a first stage, and comparison to the full signature substring 322 acts as a second, subsequent stage (e.g., to confirm whether or not the full signature substring 322 is actually present).

Returning to configuration operations, and more specifically in the example here, substring storage address allocation module 360 receives search block assigned status 356 from search block selection module 350 (e.g., after a positive allocation for each of the six substring indicators 722). Search block assigned status 356 also includes substring indicators 722. Substring storage address allocation module 360 performs a hashing function 1012 on the substring indicators 722 collectively (e.g., on a concatenation of the four or six substring indicators 710, 722) to identify a memory address location for substring memory region 1010B from the substring memory module 212. Each substring memory region 1010 includes a dedicated amount of storage space for storing the full signature substring 322 (e.g., the four, eight, or sixteen-byte substring), as well as information associated with that substring 322, such as, for example, substring indicators 722 and values for substring 722C, SID, K, SBL, N, M, and J. Substring storage address allocation module 360 determines whether the substring memory region 1010B is available for use via a substring storage request 362. Substring memory module 212 returns a substring storage result 364 indicating positive or negative results.

Figure 11:
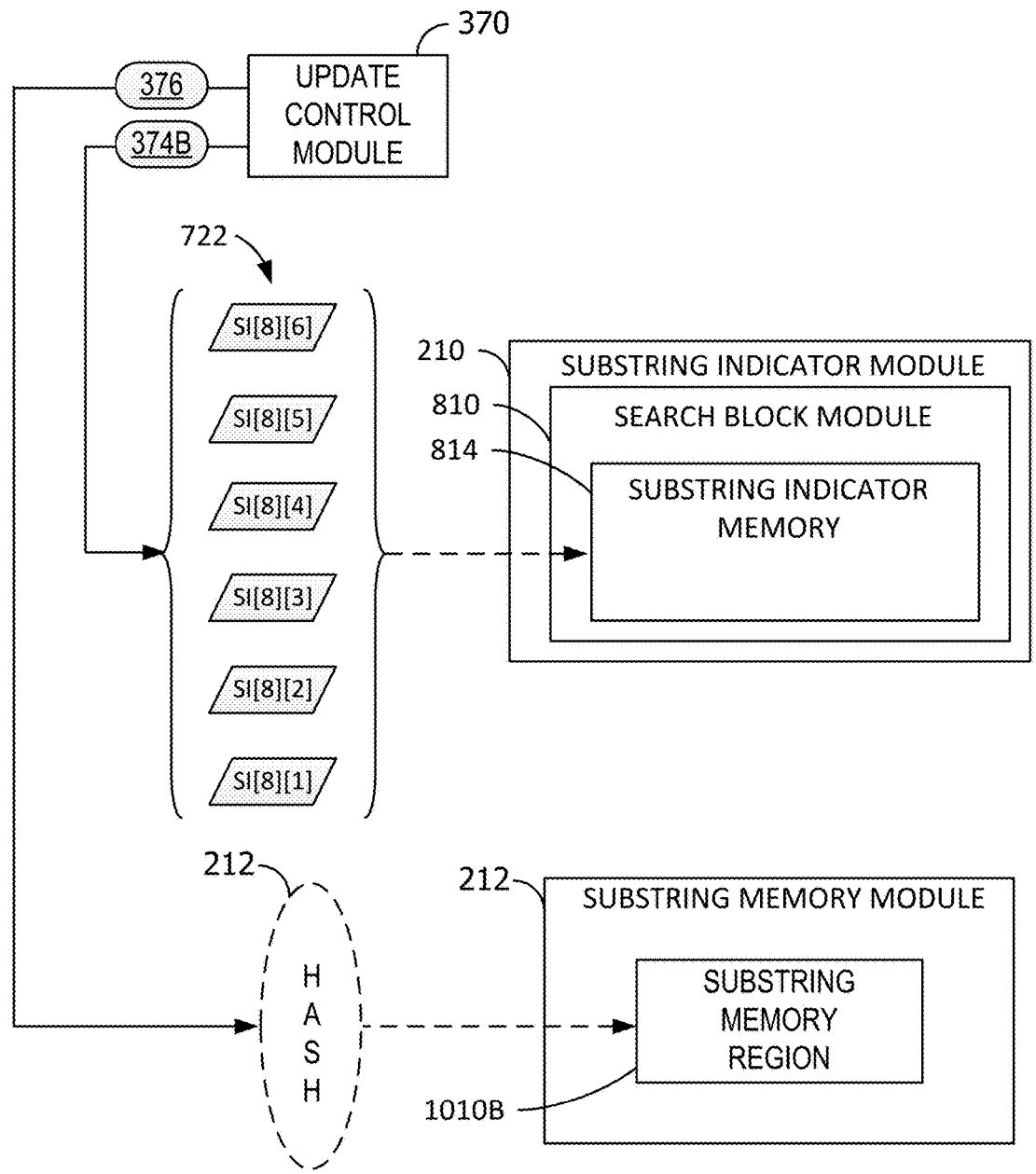

Referring again to FIG. 3, when substring storage address allocation module 360 receives positive results, substring storage address allocation module 360 transmits a positive storage allocation result 366 to search block selection module 350. Upon a positive storage allocation result 366, search block selection module 350 returns a positive result as an allocation result 358 to substring masking module 330. After substring masking module 330 receives positive results for each generated substring 510, substring masking module 330 forwards the positive result to update control module 370 as substring update result 334, thereby informing update control module 370 that signature substrings 510 can be assigned to the identified search block modules 810 (e.g., as addressed by substring indicators 722) and substring memory region 1010. FIG. 11 illustrates an update and activation process for search block module(s) 810 allocated after positive response is received by update control module 370. In the example embodiment, upon receipt of positive signal via substring update result 334, update control module 370 updates search block module 210 and substring storage memory module 212 via search module update control 374B and substring memory update control 376 (e.g., to perform allocation requests 352 in search blocks module 210, and to perform substring storage requests 362 in substring memory module 212), thereby configuring the identified search block module 210 to identify the substrings. More specifically, for each substring 510, each counter of each substring indicator 722 is incremented by one, and the associated substring information is stored in the identified substring memory region 1010B, thereby completing configuration of that substring 510. Update control module 370 then returns to an idle state, sending a positive signal update availability 372 to signature table module 310, thereby allowing another signature update to be processed.

Figure 12:
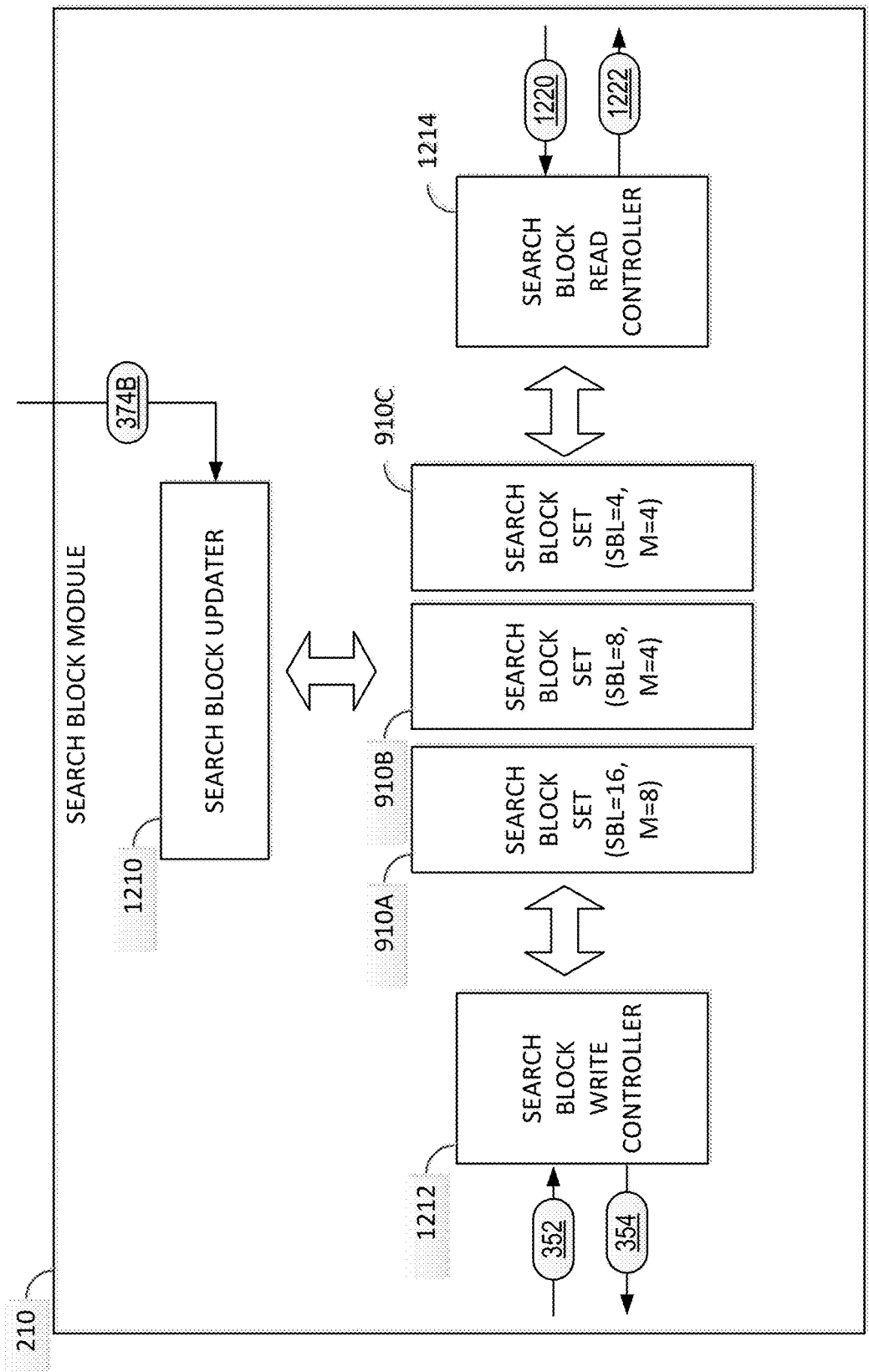

FIG. 12 is a component diagram illustrating additional components of search block module 210. In the example embodiment, search block module 210 includes a search block updater 1210, a search block write controller 1212, and a search block read controller 1214, in addition to search block 810 (e.g., in the single search block embodiment described in FIGS. 8A and 8B), or the search block sets 910 shown here (e.g., and as described in FIGS. 9A & 9B). During configuration operations, search block write controller 1212 receives and processes allocation requests 352, responding with allocation results 354 (e.g., as described above with respect to FIGS. 3 and 8). Search block updater 1210 is configured to receive and process search module update control 374B from signature update control module 370, identifying a specific search block module 810 or specific search block modules 810 of a particular search block set 910 as available for updates (e.g., allocation to a new substring 510). When search block updater 1210 receives search module update control 374B, search block updater 1210 allocates the signals in search module update control 374B into groups of data to locate a specific search block set 910, the particular search block modules 810, the addresses (e.g., substring indicators 710, 722) of each counter within those search block modules 810, and the associated update values that are to be written in substring memory region 1010B.

During searching operations, search block read controller 1214 receives signals from signature search module 204. When a search request 1220 is applied to search block module 210, search block read controller 1214 will connect the accesses to designated search blocks 1010, sending read results 1222 back to search block module 210. Various operational uses are described in greater depth below with regard to FIG. 13 and associated sub-figures.

Returning again to FIG. 3, in some situations, failures may occur at various stages of the update process. For example, when a search block allocation request 352 or substring storage request 362 fails, a negative signal is sent to substring masking module 330 via allocation result 358. In response to such a failure, substring masking module 330 may then attempt to use another masked substring 332. For example, if a substring with bytes 1-8 of substring 510C1 fails, then substring masking module 330 may attempt to use bytes 2-9 as masked substring 332. In some embodiments, substring masking module 330 may switch to a different size mask. For example, when all 8-byte masked substrings 612C fail, substring masking module 330 may partition signature substring 322 into 8-byte substrings 510B and try 4-byte substrings 610B. In some embodiments, signature masking module 330 may delete the first byte from signature substring 322 and try the substring masking process again using the shortened signature substring 322. If all variations of such alternatives fail, then the signature update process overall may fail and the particular signature pattern 206 may be refused.

Figure 13:
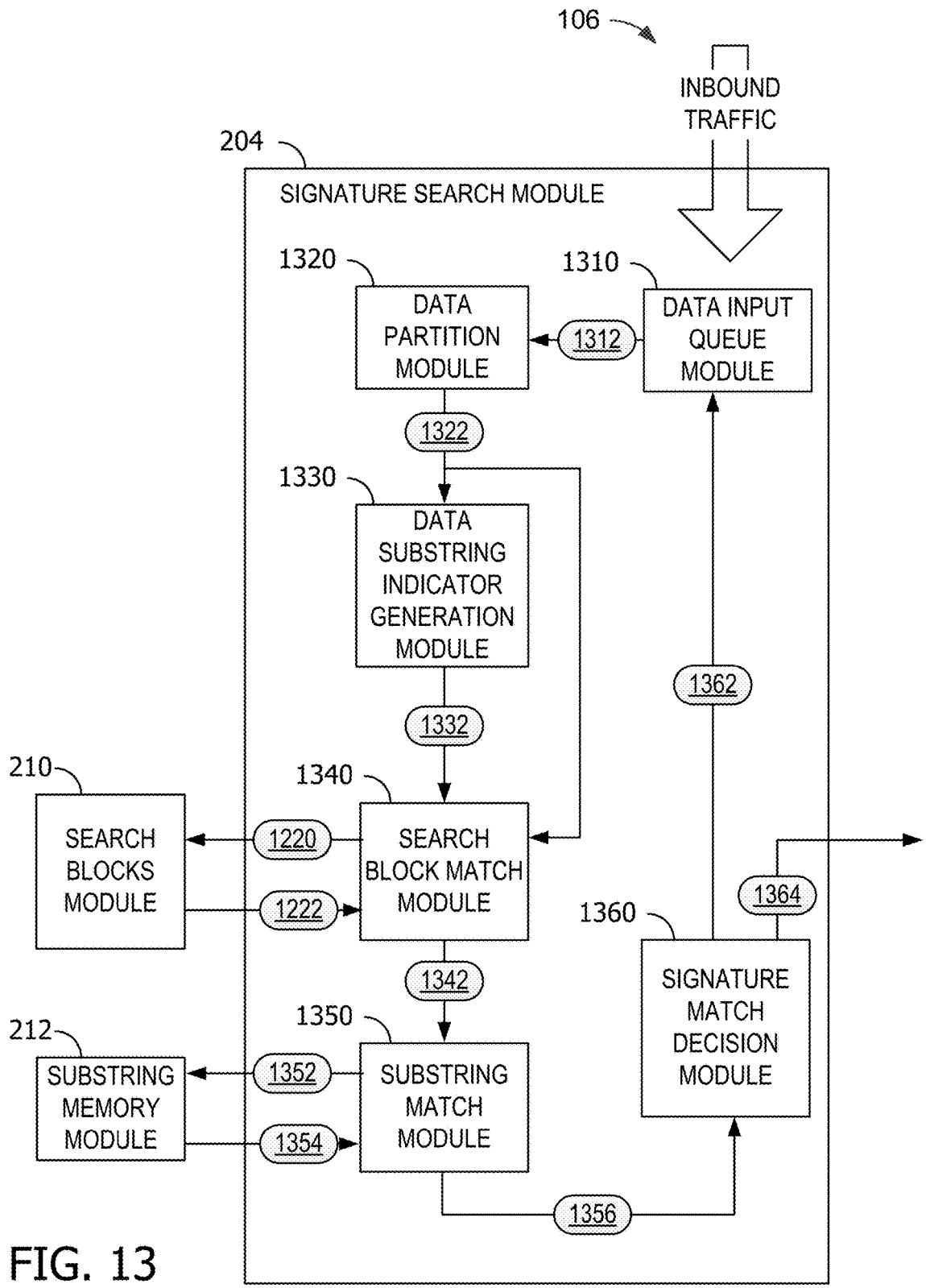

FIG. 13 is a diagram illustrating various example components of signature search module 204 and example data flow between those components. In the example embodiment, signature search module 204 performs searching operations on the inbound traffic 106 (e.g., a network data flow of TCP/IP packets), searching for occurrences of signature patterns 206 within that inbound traffic 106 using the search block modules 810 of search block module 210 configured as described above with respect to FIGS. 3-12. Signature search module 204 includes a data input queue module 1310, a data partition module 1320, a data substring indicator generation module 1330, a search block match module 1340, a substring match module 1350, and a signature match decision module 1360.

Figure 14:
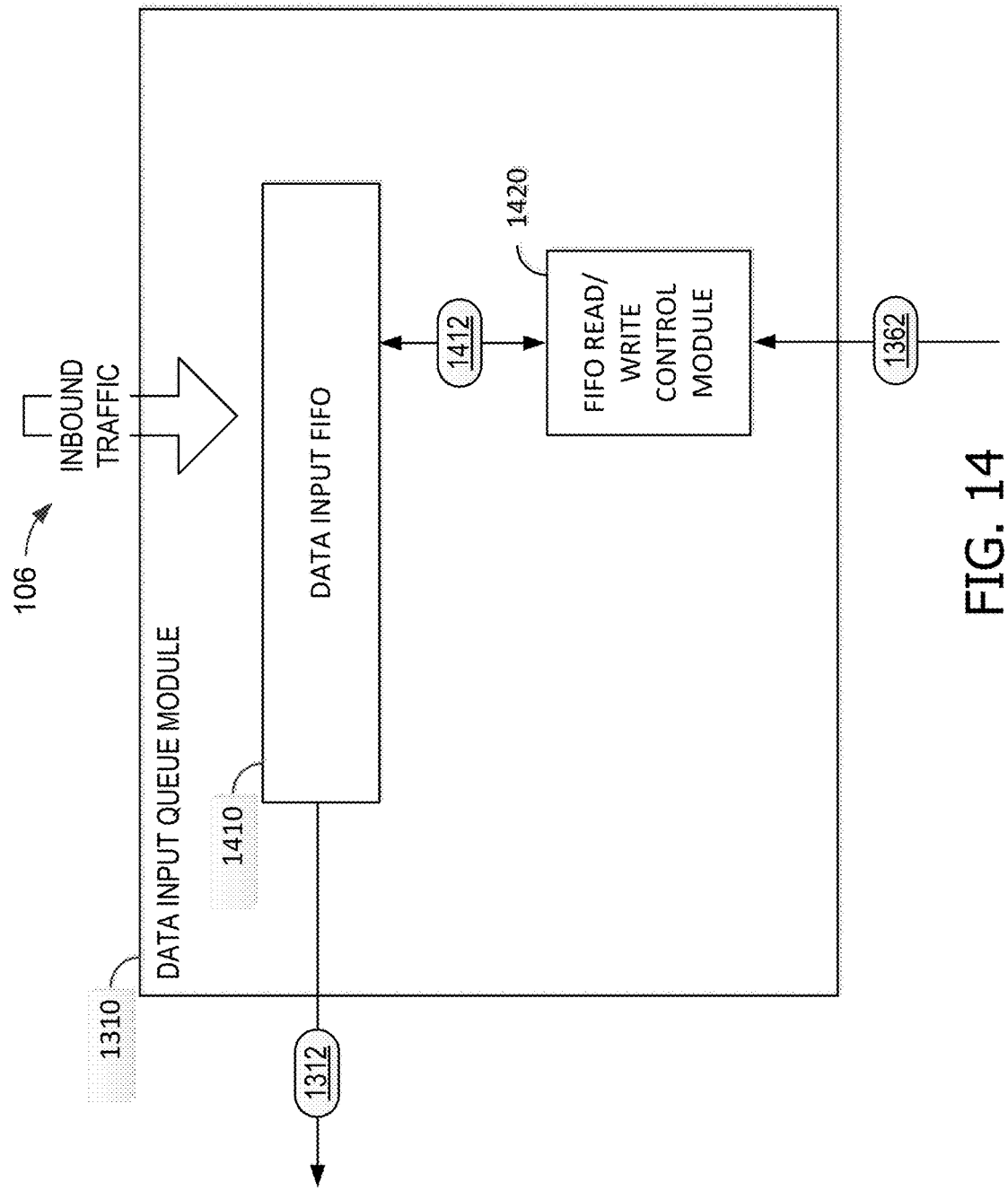

Data input queue module 1310 is configured to receive inbound traffic 106 (e.g., as a continuous stream of network packets) during searching operations. The phrases "subject data" or "subject data stream" may be used herein to refer to the data to be searched for signature patterns 206 (e.g., the data of inbound traffic 106). In other words, subject data is data that is subjected to inspection, by signature detection engine 102, for potentially containing one or more signature patterns 206. FIG. 14 illustrates data flow and operation of data input queue module 1310 in greater detail. In the example embodiment, data input queue module 1310 includes data input FIFO(s) 1410 and a FIFO read/write control module 1420. Upon receipt of inbound traffic 106, the subject data is temporarily stored in data input FIFO(s) 1410. In some embodiments, inbound traffic 106 is the payload portion of Ethernet 2.0/VLAN frames carrying IPv4 or IPv6 packets, including TCP/IP headers and associated payloads.

In the example embodiment, data input FIFO 1410 acts as a buffer for the subject data before the subject data is sent to data partition module 1320 as original data 1312. In some embodiments, header values for layer-2, layer-3, layer-4, and session data may be identified as the data is received. For 1 gigabit Ethernet (1 GbE) and 10 gigabit Ethernet (10 GbE) frames, data may be processed in 1-byte or 8-byte data widths, respectively. Flow of the suspect data stream through data input queue module 1310 is controlled by a data read control signal 1362. Signature match decision module 1360 transmits a positive signal to data input queue module 1310 when signature match decision module has capacity to process additional data, or transmits a negative signal to data input queue module 1310 when signature match decision module 1360 is too busy to process additional data. As such, FIFO read/write control module 1420 receives data read control signal 1362 and initiates transmission of the data stream (e.g., as original data 1312) from data input FIFO 1410 to data partition module 1320 when data read control signal 1362 is positive. In some embodiments, the subject data of inbound traffic 106 may be normalized (data normalization, e.g., prior to receipt by signature search module 204, or by data input queue module 1310).

Figure 15:
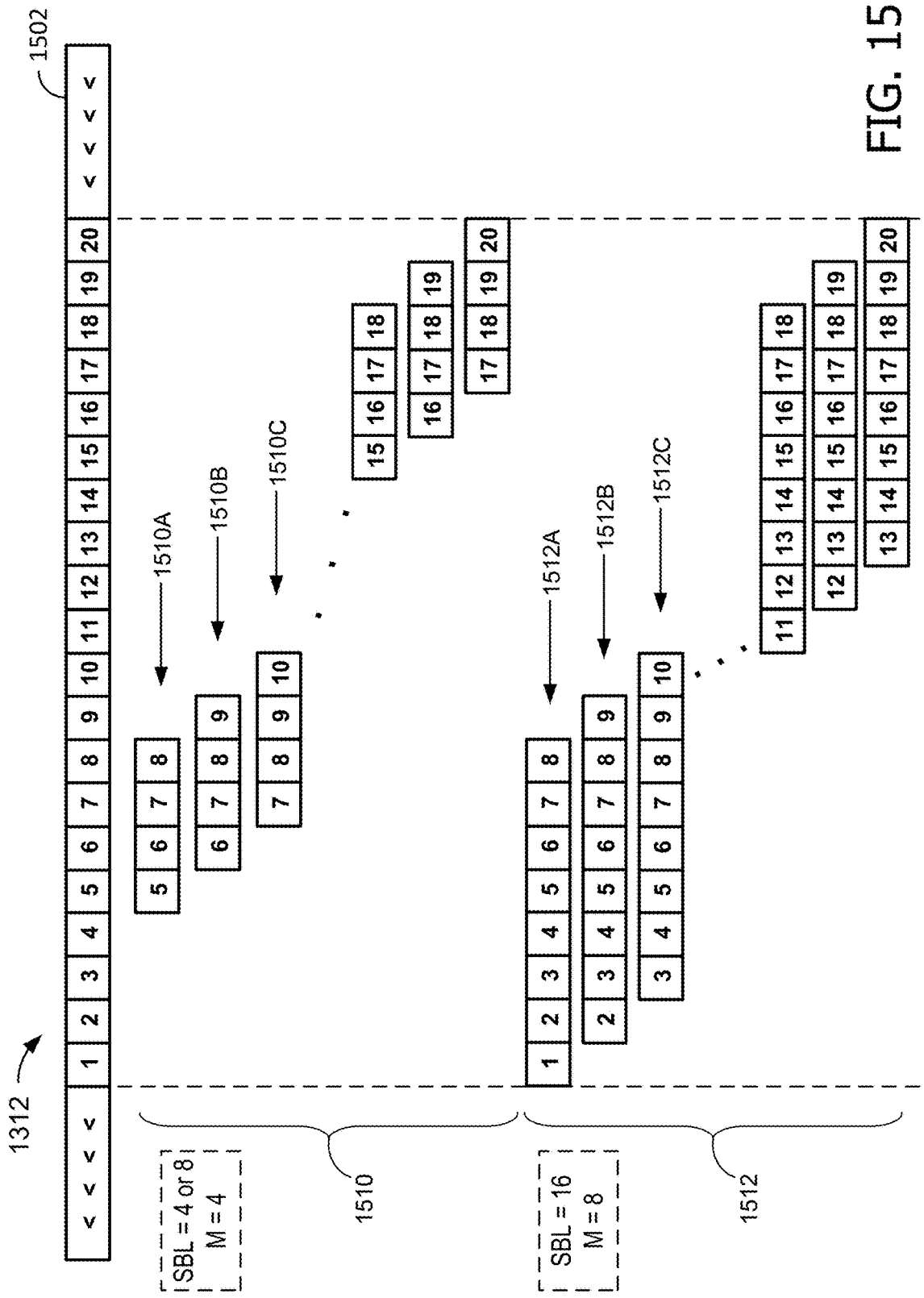

Referring again to FIG. 13, the data stream is transmitted from data input queue module 1310 to data partition module 1320 as original data 1312. As data partition module 1320 receives original data 1312, data partition module 1320 begins generating substrings (or "subject substrings") 1510, 1512 from original data 1312. Subject substrings 1510, 1512 may be used by signature search module 204 to generate addresses for particular search block modules 810, as described below. FIG. 15 illustrates original data 1312 as a chronological stream of data 1502, as received by data partition module 1320. In the example embodiment, data partition module 1320 performs a partitioning process to identify one or more subject substrings from the most recent original data 1312. In FIG. 15, twenty bytes of original data 1312 are shown in stream of data 1502, referred to herein as bytes "1" through "20." Further, stream of data 1502 also represents a timeline of the receipt of original data 1312 by data partition module 1320, left to right, where each block within stream of data 1502 represents one clock cycle. In other words, data partition module 1320 receives original data 1312 one block per clock cycle, starting with byte "1" and continuing through byte "20". As such, and for purposes of discussion, time, t, may be expressed herein in relation to the byte numbers shown in stream of data 1502 (e.g., "1" is received at t=1, "2" is received at t=2, and so forth).

In the example embodiment, data partition module 1320 determines one or more subject substrings 1510, 1512 based on sliding windows of data from stream of data 1502. More specifically, data partition module 1320 generates 4-byte substrings 1510 and 8-byte substrings 1512 based on the configuration of search blocks module 210, which includes some search blocks having M=4 (e.g., search blocks 1010B and 1010C) and some search blocks having M=8 (e.g., search blocks 1010A). As described above, search block modules 810 within a particular search block 1010 may be addressed based on substring indicators generated from the data content of a given substring (e.g., substring indicators 720 from substrings 510). During configuration in the example embodiments described above, the particular substring 510 was assigned to a particular search block module 810 within a particular search block 1010 based on the size of the substring (e.g., SBL=16) and based on the size of the mask (e.g., M=8). Here, during searching operations, the same search block modules 810 may be identified based on the data contents of subject substrings 1510, 1512 from stream of data 1502 by generating addresses (e.g., substring indicators) from subject substrings 1510, 1512.

As such, data partition module 1320 generates 4-byte subject substring 1510 and 8-byte subject substring 1512 at each clock cycle. For example, at time t=8, data partition module 1320 generates 4-byte subject substring 1510A with the most recent 4 bytes of data from stream of data 1502 (e.g., bytes "5" through "8"). In addition, and also at time t=8, data partition module 1320 also generates 8-byte subject substring 1512A with the most recent 8 bytes of data from stream of data 1502 (e.g., bytes "1" through "8"). Both subject substrings 1510A and 1512A are sent as subject substrings 1322 to data substring indicator generation module 1330 and to search block match module 1340.

Similarly, at each clock cycle, and after receiving the next incoming byte from data input queue module 1310, data partition module 1320 again generates 4-byte subject substring 1510 and 8-byte subject substring 1512 with the most recent 4 bytes and most recent 8 bytes of stream of data 1502. For example, at time t=9, data partition module 1320 generates 4-byte subject substring 1510B with bytes "6" through "9" and 8-byte subject substring 1512B with bytes "2" through "9". Again, these subject substrings 1510B and 1512B are sent as subject substrings 1322 to data substring indicator generation module 1330 and to search block match module 1340.

Figure 16:
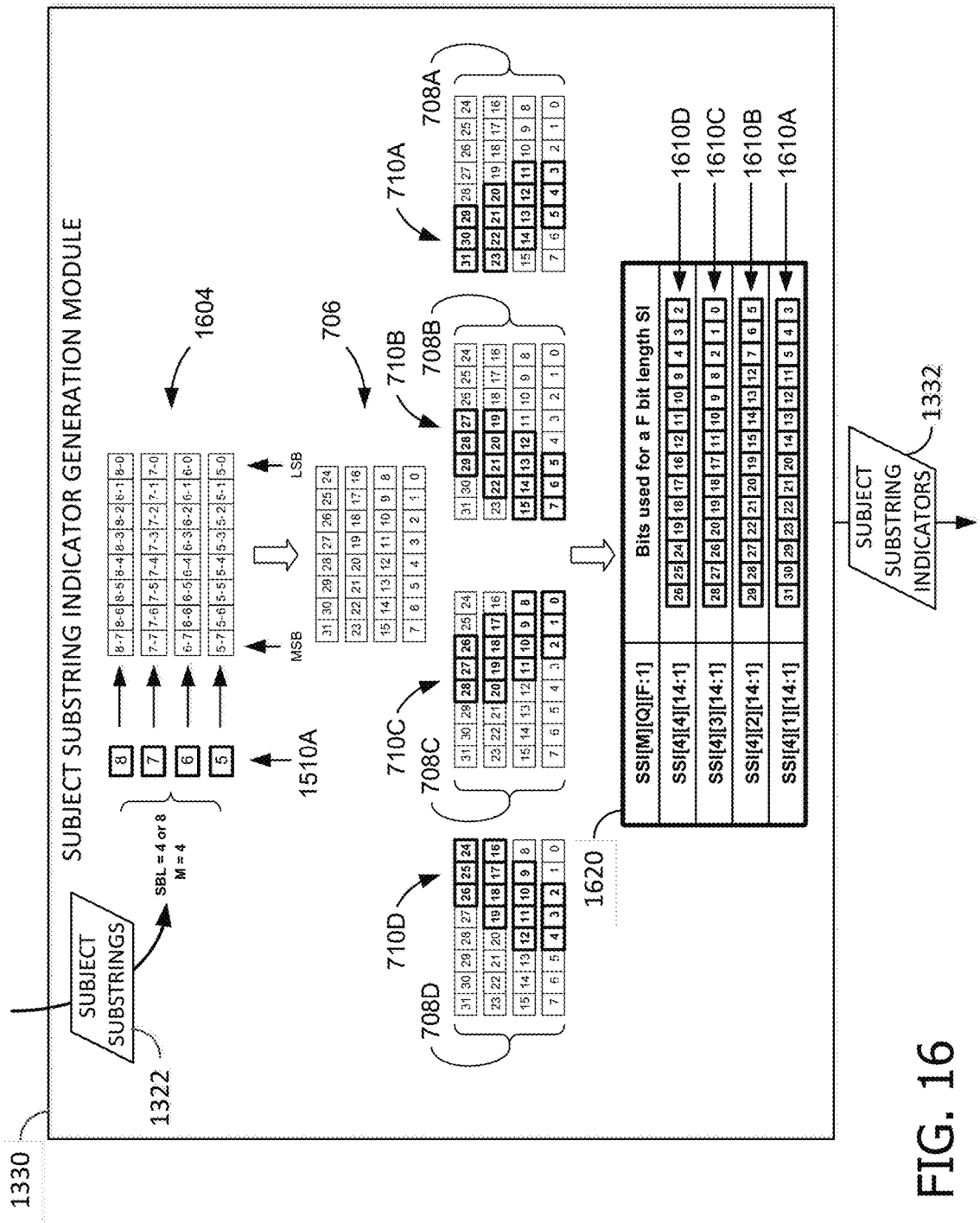

As such, at each clock cycle, and referring again to FIG. 13, data partition module 1320 receives a new byte from data input queue module 1310, updates the subject substrings 1510, 1512, and sends the most recent subject substrings 1510, 1512 to data substring indicator generation module 1330 and search block match module 1340 as subject substrings 1322. Each substring 1322 represents a substring that will be passed to search blocks module 210 for inspection. FIG. 16 illustrates an example embodiment in which subject substring indicator generation module 1330 generates a set of substring indicators 1620 for the 4-byte subject substring 1510 generated by data partition module 1320 and included in subject substrings 1332. Subject substring indicator generation module 1330 generates substring indicators similar to as described above with respect to FIGS. 7A-7C, using subject substrings 1322 as the inputs. While FIG. 16 illustrates generation of set of substring indicators 1620 using 4-byte search substring 1510A as an example, it should be understood that subject substring indicator generation module 1330 also generates a similar set of substring indicators (not shown, including six substring indicators) using 8-byte subject substring 1512 similar to the 8-byte example shown and described in reference to FIG. 7C.

In FIG. 16, subject substring indicator generation module 1330 generates set of substring indicators 1620 for subject substring 1510A. More specifically, subject substring indicator generation module 1330 receives subject substring 1510A, which includes four bytes, "5", "6", "7", and "8". For purposes of illustration, FIG. 16 illustrates the bits of each byte of subject substring 1510A in a bit table 1604, similar to bit table 704, as well as ordinal table 706. With regard to bit masks, subject substring indicator generation module 1330 utilizes the same bit masks as described above, and based on the size of subject substring 1322. In other words, subject substring indicator generation module 1330 uses four bit masks 708 for 4-byte subject substrings 1510 and six bit masks 718 for 8-byte subject substrings 1512. And similar to as described above, subject substring indicator generation module 1330 utilizes bit masks 708 in conjunction with bit table 1604 for the four bytes of subject substring 1510A to create subject signature indicators 1610A, 1610B, 1610C, and 1610D (collectively, subject signature indicators 1610) (e.g., "SSI[4][Q]"). Subject substring indicator generation module 1330 may generate substring indicators 1620, 1610, 1332 as described above with respect to substring indicator selection module 340 and substring indicators 720A, 710, 342.

These subject signature indicators 1610 generated from 4-byte subject substring 1510 may be referred to collectively as 4-byte subject signature indicators 1620. Further, and as mentioned above, subject substring indicator generation module 1330 also generates substring indicators for 8-byte subject substring 1512. These substring indicators may be referred to collectively as 8-byte subject substring indicators (not separately shown).

Figure 17:
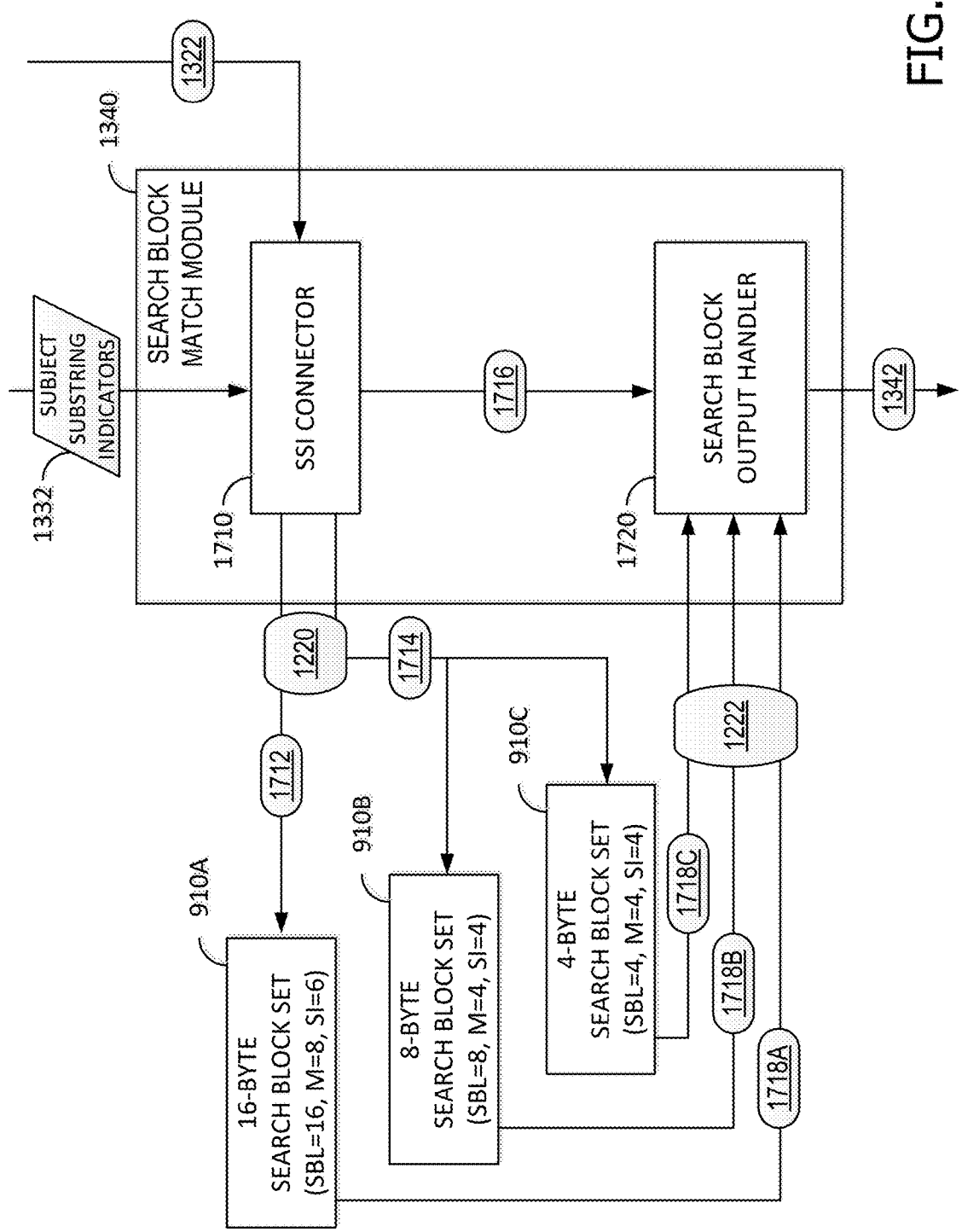

Referring again to FIG. 13, at each clock cycle, subject substring indicator generation module 1330 receives subject substrings 1322 and generates 4-byte subject substring indicators 1620 (e.g., four subject substring indicators 1610) from 4-byte subject substring 1510 and 8-byte subject substring indicators (e.g., six subject substring indicators) from 8-byte subject substring 1512. Both the 4-byte subject substring indicators 1620 and the 8-byte subject substring indicators are sent to search block match module 1340 as subject substring indicators 1332. FIG. 17 illustrates example searching operations performed by search block match module 1340 in conjunction with substring indicator module 210. Search block match module 1340 sends subject substrings 1322 to substring indicator module 210 for inspection (e.g., to determine whether subject substring indicators 1332 match all configured substring indicators 710, 722 for any of the configured substrings (e.g., masked substrings 332)). Similar to as described in relation to configuration operations, substring indicator module 210 uses search substring indicators 1332 to direct inspection to particular search block modules 810 within search block sets 910, and to particular counters 812 at addresses 814 indicated by those search substring indicators 1332.

More specifically, and in the example embodiment, search block match module 1340 includes a search substring indicator (SSI) connector 1710 and a search block output handler 1720. SSI connector 1710 receives subject substrings 1322 from data partition module 1320 and subject substring indicators 1332 from data substring indicator generation module 1330 at each clock cycle. SSI connector 1710 may synchronize or otherwise coordinate pairing of subject substrings 1322 and subject substring indicators 1332 to ensure that the particular substrings and substring indicators are properly paired together (e.g., based on staggered timing of receipt).

As such, and for example, at each clock cycle, SSI connector 1710 may have subject substrings 1510, 1512 and associated subject substring indicators (e.g., 4-byte subject substring indicators 1620 and the set of 8-byte subject substring indicators). For each subject substring 1510, 1512, SSI connector 1710 identifies a particular search block set 910 within search blocks module 210 (e.g., based on parameters of subject substring 1510, 1512, such as SBL or M). For example, SSI connector 1710 may identify search block 910A for subject substring 1512, which has M=8, and may identify search blocks 910B and 910C for subject substring 1510, which has M=4. As such, SSI connector 1710 then sends subject substring 1510, 1512 to the identified search block set 910 along with addresses for to be used within search block module(s) 810 (e.g., as subject substring indicators 1332) as search request 1220. For example, an 8-byte search request 1712 may include subject substring 1512 and the 8-byte subject substring indicators, and a 4-byte search request 1714 may include subject substring 1510 and 4-byte subject substring indicators 1620. As such, in this example, SSI connector 1710 sends two search requests 1712, 1714 at each clock cycle, one for 4-byte subject substring 1510 and one for 8-byte subject substring 1512.

During processing of search requests 1220, search block module(s) 810 utilize the included subject substring indicators as addresses within the particular search block modules 810 to address the counters 816 of the particular subject substring indicators 1620. Since the subject substring indicators 1620 were constructed using the same process as during configuration, a particular subject substring 1510, 1512 that matches a configured substring (e.g., masked substring 612) will generate the same four or six substring indicators, and thus will be routed to the appropriate addresses within the search block modules 810. Search block modules 810 compare the included subject substring 1510, 1512 with the substring as configured.

The search block modules 810 addressed by search requests 1712, 1714 respond (e.g., via their associated search blocks 1010) with three different read results 1718A, 1718B, 1718C (collectively, "read results 1718"). Each read result 1718 is an aggregation of the outputs of the four or six counters 816 addressed by the four or six search substring indicators 1620. In the example embodiment, if all four or six counters 816 identified by the search substring indicators 1620 are non-zero, then that subject substring 1510, 1512 is considered a match. As such, that particular read result 1718 is transmitted as a HIGH value. If one or more of the four or six counters are zero, then that particular read result 1718 is transmitted as a LOW value.

When search block output handler 1720 receives read results 1718 and finds that one or more of the particular read results 1718 are HIGH (e.g., indicating that a first stage match has occurred on one or more of the associated substring subject substrings 1510, 1512), search block output handler 1720 sends the read results 1718 and other associated information (e.g., matching subject substring(s) 1322, subject substring indicators 1332) to substring match module 1350 as match results 1342. Transmission of match results 1342 causes signature search module 204 to perform further comparison operations to determine whether the matching subject substring(s) 1510, 1512 actually match a full substring.

Figure 18:
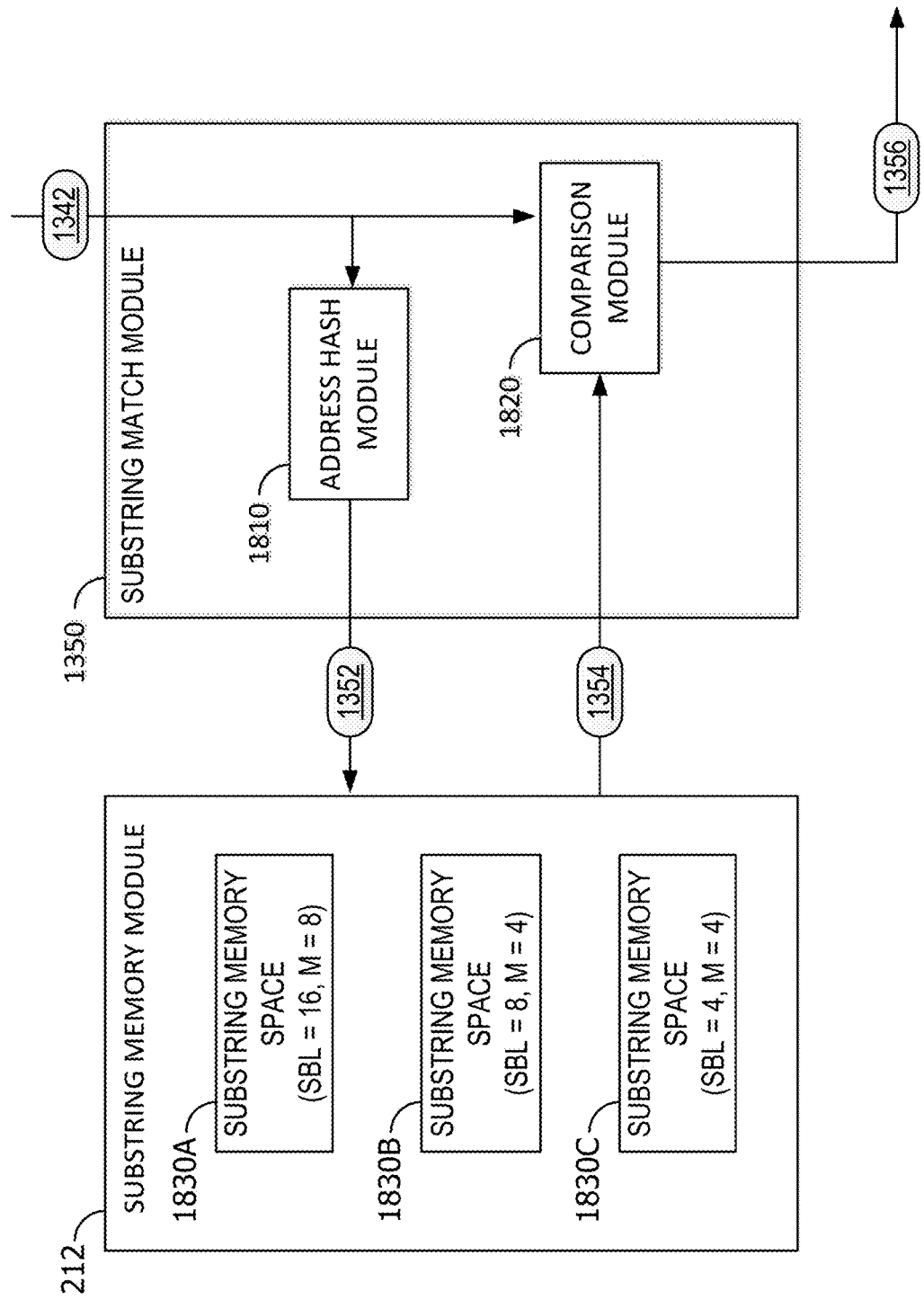

Referring again to FIG. 13, based on search results 1222 from search blocks module 210, search block match module 1340 sends match results 1342 to substring match module 1350. FIG. 18 illustrates components of substring match module 1350 used to identify an associated substring memory region 1010 within substring memory module 212. Substring match module 1350 includes an address hash module 1810 and a comparison module 1820. In the example embodiment, match results 1342 are sent to both address hash module 1810 and comparison module 1820. Address hash module 1810 performs a hash function on the search substring indicators included in match results 1342. Hash module 1810 performs the same hashing process on subject substring indicators 1332 as hash 1012 (shown and described with respect to FIG. 10). Since the search substring indicators 1332 are the same substring indicators 720 as used during configuration (e.g., because the substrings have been confirmed to match at this point), hashing the search substring indicators 1332 results in the same address of the associated substring within substring memory module 212.

After address hash module 1810 hashes the search substring indicators, address hash module 1810 sends one or more read requests 1352 to substring memory module 212. Substring memory module 212, in this example, includes three different segmented memory regions, substring memory spaces 1830A, 1830B, 1830C (collectively, substring memory spaces 1830"). Each substring memory space 1830 may be similar to substring memory space 1014. Substring memory space 1830A includes memory configured for substrings with SBL=16 and M=8. Substring memory space 1830B includes memory configured for substrings with SBL=8 and M=4. Substring memory space 1830C includes memory configured for substrings with SBL=4 and M=4. As such, for each matched search substring 1322, the hashed address of that matched search substrings 1322 reference a particular substring memory region 1010 within particular substring memory spaces 1830 (e.g., based on the underlying SBL and M properties of the current matching substring(s)). The generated hashed address is sent to substring memory module 212 as a part of read request 1352.

Substring memory module 212 sends a read result 1354 to substring match module 1350. If the hashed address does not contain a configured substring (a negative response), then this indicates that the match result 1342, even though passing the first stage, did not pass the second stage and, as such, further investigation of that particular match result 1342 is terminated. However, if the hashed address contains a configured substring (a positive response), substring memory module 212 includes the full substring 510 in the read result 1354, and may include any additional data stored during configuration, such as original signature length, K, protocol type or port number (e.g., if the signature was defined with specific IP protocol or TCP/UDP port numbers. In this example, the hashed address is the hashed address for substring memory region 1010B. Upon receiving a positive response in read result 1354, comparison module 1820 compares the subject substring 1510, 1512 from match results 1342 with the full substring 510 returned in read results 1354 with subject substrings 1510, 1512. If comparison module 1820 does not detect a match based on the comparison, then the match result 1342 has failed the second stage, and further investigation of that particular match result 1342 is terminated. However, if comparison module 1820 detects a match based on the comparison, then the information from read result 1354 (e.g., SID, K, SBL, and so forth) is sent to signature match decision module 1360 as match result 1356, indicating a successful match during the second stage.

Figure 19:
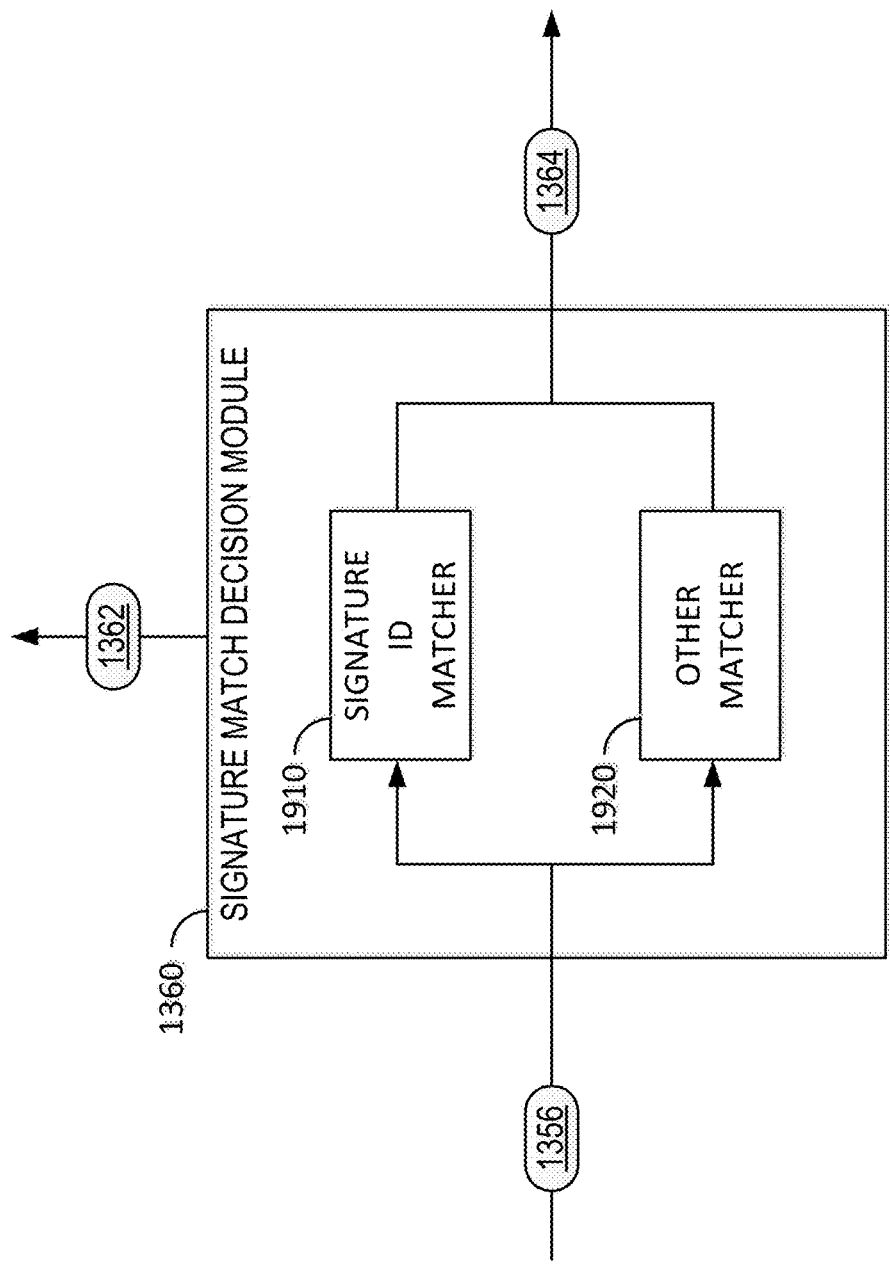

FIG. 19 illustrates components of signature match decision module 1360 and associated operations. Signature match decision module 1360 operates to correlate multiple match results 1356 for a particular signature pattern 206, as well as isolate match results 1356 to particular communication sessions. In the example embodiment, signature match decision module 1360 includes a signature ID matcher 1910 and an other matcher 1920. Here, match result 1356 is sent to both signature ID matcher 1910 and other matcher 1920. Signature match decision module 1360 is configured to compare the content of match result 1356 separately to check whether the current match result 1356 relates to a previously detected substring within a communications channel (e.g., within a TCP/IP session between two servers). By comparing signature ID and other constraints, a signature match result 1364 may be detected and reported. If signature detection engine 102 is used for network intrusion detection (e.g., as an Intrusion Prevention System (IPS)), the full signature pattern detection result may be used to drop the packets that carried the data payload that matched a full signature pattern from the outbound traffic 108.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A network device comprising:
a substring indicator memory; and
a signature search hardware module for detecting a signature pattern within a stream of network traffic, the signature search hardware module is configured to:
receive the stream of network traffic;
identify a first subject substring from the stream of network traffic;
generate a first substring indicator for the first subject substring using a first bitmask on the first subject substring, the first bitmask identifying a plurality of masked bits of the first subject substring;
identify a first counter using the first substring indicator as an address into the substring indicator memory; and
generate an indication that the signature pattern may be present in the stream of network traffic based on a value of the first counter.

2. The network device of claim 1 further comprising a signature update hardware module for configuring the signature search hardware module to detect the signature pattern, the signature update hardware module is configured to:
receive, during a configuration operation, the signature pattern to be detected within the stream of network traffic, the signature pattern includes a signature string of data;
identify a configuration substring from the signature string, the configuration substring including a plurality of bytes of the signature string;
generate a second substring indicator for the configuration substring using the first bitmask on the substring, the first bitmask identifying a first plurality of masked bits of the configuration substring;
identify the first counter within the substring indicator memory by using the second substring indicator as an address into the substring indicator memory; and
increment the identified first counter.

3. The network device of claim 2, further comprising a substring memory hardware module that includes a substring memory space, wherein the signature update hardware module is further configured to:
generate an address for a substring memory region within the substring memory space using a hashing function on the first and second substring indicators; and
store the configuration substring in the substring memory region using the generated address.

4. The network device of claim 2, the signature update hardware module is further configured to:
identify another configuration substring from the signature string, the configuration substring including a second plurality of bytes of the signature string different than the configuration substring;
generate a third substring indicator for the other configuration substring using the first bitmask on the substring, the first bitmask identifying a first plurality of masked bits of the other configuration substring;
determine that a value of a second counter, at an address identified by the third substring indicator and within the substring indicator memory, exceeds a pre-determined threshold; and
reject use of the other configuration substring during the configuration operation based on the determining.

5. The network device of claim 2, wherein identifying a configuration substring from the signature string further includes:
selecting a subset of n bytes of the signature string;
masking the subset of n bytes of the signature string into a substring of M bytes, where M is less than n; and
using the substring of M bytes as the configuration substring during the configuration operation.

6. The network device of claim 1, wherein the signature search hardware module is further configured to:

compare, in response to the generated indication, the first subject substring to a configuration substring to determine whether the first subject substring matches the configuration substring; and generate, based on the comparing, an indication that the configuration substring is present in the stream of network traffic.

7. The network device of claim 6, wherein the signature search hardware module is further configured to:

generate a plurality of indications that a plurality of configurations substrings associated with the signature pattern are present in the stream of network traffic;

compare, based on the generated plurality of indications, the signature pattern to the stream of network traffic to determine that the signature pattern is found in the stream of network traffic; and generate, based on the determining that the signature pattern is found in the stream of network traffic, an indication that the signature pattern is present in the stream of network traffic.

8. The network device of claim 1, wherein the signature search hardware module is further configured to:

generate a third substring indicator for the first subject substring using a second bitmask on the first subject substring, the second bitmask identifying a plurality of masked bits of the first subject substring different than the first bitmask; and identify a second counter using the third substring indicator as an address into the substring indicator memory, wherein generating an indication that the signature pattern may be present in the stream of network traffic is further based on the value of the second counter.

9. The network device of claim 1, wherein identifying the first subject substring includes identifying a sliding window of $M_1$ most recent bytes of data from the stream of network traffic, wherein the signature search hardware module is further configured to:

identify a second subject substring of a sliding window of $M_2$ most recent bytes of data from the stream of network traffic, where $M_1 \neq M_2$;

generate a second substring indicator for the second subject substring using a second bitmask on the second subject substring, the second bitmask identifying a plurality of masked bits of the second subject substring;

identify a second counter using the second substring indicator as an address into the substring indicator memory; and generate an indication that another signature pattern may be present in the stream of network traffic based on the value of the second counter.

10. A method for performing hardware-based pattern matching in a network device, the method comprising:

receiving, by a signature search hardware module of the network device, a stream of network traffic;

identifying a first subject substring from the stream of network traffic;

generating a first substring indicator for the first subject substring using a first bitmask on the first subject substring, the first bitmask identifying a plurality of masked bits of the first subject substring;

identifying a first counter using the first substring indicator as an address into a substring indicator memory; and generating an indication that the signature pattern may be present in the stream of network traffic based on a value of the first counter.

11. The method of claim 10, further comprising:

receiving, during a configuration operation, a signature pattern to be detected within the stream of network traffic, the signature pattern includes a signature string of data;

identifying a configuration substring from the signature string, the configuration substring including a plurality of bytes of the signature string;

generating a second substring indicator for the configuration substring using the first bitmask on the substring, the first bitmask identifying a first plurality of masked bits of the configuration substring;

identifying the first counter within the substring indicator memory by using the second substring indicator as an address into the substring indicator memory; and incrementing the identified first counter.

12. The method of claim 11, further comprising:

generating an address for a substring memory region within the substring memory space using a hashing function on the first and second substring indicators; and storing the configuration substring in the substring memory region using the generated address.

13. The method of claim 11, further comprising:

identifying another configuration substring from the signature string, the configuration substring including a second plurality of bytes of the signature string different than the configuration substring;

generating a third substring indicator for the other configuration substring using the first bitmask on the substring, the first bitmask identifying a first plurality of masked bits of the other configuration substring;

determining that a value of a second counter, at an address identified by the third substring indicator and within the substring indicator memory, exceeds a pre-determined threshold; and rejecting use of the other configuration substring during the configuration operation based on the determining.

14. The method of claim 11, wherein identifying a configuration substring from the signature string further includes:

selecting a subset of n bytes of the signature string;

masking the subset of n bytes of the signature string into a substring of M bytes, where M is less than n; and using the substring of M bytes as the configuration substring during the configuration operation.

15. The method of claim 10, further comprising:

comparing, in response to the generated indication, the first subject substring to a configuration substring to determine whether the first subject substring matches the configuration substring; and generating, based on the comparing, an indication that the configuration substring is present in the stream of network traffic.

16. The method of claim 15, further comprising:

generating a plurality of indications that a plurality of configurations substrings associated with the signature pattern are present in the stream of network traffic;

comparing, based on the generated plurality of indications, the signature pattern to the stream of network traffic to determine that the signature pattern is found in the stream of network traffic; and generating, based on the determining that the signature pattern is found in the stream of network traffic, an indication that the signature pattern is present in the stream of network traffic.

17. The method of claim 10, further comprising:
generating a third substring indicator for the first subject substring using a second bitmask on the first subject substring, the second bitmask identifying a plurality of masked bits of the first subject substring different than the first bitmask; and
identifying a second counter using the third substring indicator as an address into the substring indicator memory,
wherein generating an indication that the signature pattern may be present in the stream of network traffic is further based on the value of the second counter.

18. The method of claim 10, wherein identifying the first subject substring includes identifying a sliding window of $M_1$ most recent bytes of data from the stream of network traffic, the method further comprising:
identifying a second subject substring of a sliding window of $M_2$ most recent bytes of data from the stream of network traffic, where $M_1 \neq M_2$;
generating a second substring indicator for the second subject substring using a second bitmask on the second subject substring, the second bitmask identifying a plurality of masked bits of the second subject substring;
identifying a second counter using the second substring indicator as an address into the substring indicator memory; and
generating an indication that another signature pattern may be present in the stream of network traffic based on the value of the second counter.

19. The network interface card for performing hardware-based pattern matching, the network interface card is configured to be installed as a line card in a line card slot of a network device and interface with a backplane of the network device, the network interface card comprising:
a backplane connector configured to allow the network interface card to electronically couple with the backplane of the network device;
one or more ports configured to receive a stream of network traffic;
a substring indicator memory; and
a signature search hardware module for detecting a signature pattern within the stream of network traffic, the signature search hardware module is configured to:
identify a first subject substring from the stream of network traffic;
generate a first substring indicator for the first subject substring using a first bitmask on the first subject substring, the first bitmask identifying a plurality of masked bits of the first subject substring;
identify a first counter using the first substring indicator as an address into the substring indicator memory; and
generate an indication that the signature pattern may be present in the stream of network traffic based on a value of the first counter.

20. The network interface card of claim 19, further comprising a signature update hardware module for configuring the signature search hardware module to detect the signature pattern, the signature update hardware module is configured to:
receive, during a configuration operation, the signature pattern to be detected within the stream of network traffic, the signature pattern includes a signature string of data;
identify a configuration substring from the signature string, the configuration substring including a plurality of bytes of the signature string;
generate a second substring indicator for the configuration substring using the first bitmask on the substring, the first bitmask identifying a first plurality of masked bits of the configuration substring;
identify the first counter within the substring indicator memory by using the second substring indicator as an address into the substring indicator memory; and
increment the identified first counter.

\* \* \* \* \*